US006985839B1

(12) United States Patent
Motamedi et al.

(10) Patent No.: US 6,985,839 B1
(45) Date of Patent: Jan. 10, 2006

(54) SYSTEM AND METHOD FOR WIRELESS LOCATION COVERAGE AND PREDICTION

(75) Inventors: Masoud Motamedi, Woodland Hills, CA (US); Robert Blakely, Garden Grove, CA (US); Khaled Dessouky, Studio City, CA (US); Mario Proietti, Fullerton, CA (US)

(73) Assignee: Technocom Corporation, Encino, CA (US)

( * ) Notice: Subject to any disclaimer, the term of this patent is extended or adjusted under 35 U.S.C. 154(b) by 974 days.

(21) Appl. No.: 09/848,052

(22) Filed: May 3, 2001

Related U.S. Application Data

(60) Provisional application No. 60/202,147, filed on May 5, 2000.

(51) Int. Cl.
G06G 7/48 (2006.01)
H04Q 7/20 (2006.01)

(52) U.S. Cl. .................. 703/6; 455/422.1; 701/214

(58) Field of Classification Search ............... 703/6; 455/422.1; 701/214
See application file for complete search history.

(56) References Cited

U.S. PATENT DOCUMENTS 6,167,347 A * 12/2000 Lin ........................ 701/214

* cited by examiner

*Primary Examiner*—Hugh Jones
(74) *Attorney, Agent, or Firm*—Christie, Parker & Hale, LLP

(57) ABSTRACT

The software of the present invention predicts the performance of a wireless location system, including its accuracy, availability, and coverage. The tool can determine if the deployed location sensors meet, exceed, or fall short of providing the expected coverage and performance. The tool allows the location system designer to eliminate redundancies if not all sensors are needed and propose additional sites where coverage holes are present. The software tool includes a graphical user interface for ease of use.

30 Claims, 18 Drawing Sheets

Site Editor

| | |
|---|---|
| Site ID | Irvine |
| Site Name | MacArthur & Jamboree |
| Site Address | |

Site Position

| Latitude | Longitude | Ground Altitude | | |
|---|---|---|---|---|
| 33.658167 | -117.862500 | 211 | Ft | From Map |
| Compute Radial File | View Radial File | 15 | | mi |

Sectors

| Sector ID | Az | Tilt | Ht | ERP | Antenna | Model |
|---|---|---|---|---|---|---|
| ☐ Sector 1 | 30 | 0 | 35 | 92 | DB874H105 | Hata - Suburban |
| ☐ Sector 2 | 150 | 0 | 40 | 92 | DB874H105 | Hata - Suburban |
| ☐ Sector 3 | 270 | 0 | 35 | 92 | DB874H105 | Hata - Suburban |

Compute Signal Files | View | Add | Edit | Delete

Location Sensors

| Sector ID | Type | Az | Tilt | Ht | Antenna | Model |
|---|---|---|---|---|---|---|
| ☐ Sector 1 | TDMA | 30 | 0 | 35 | Antenna 1 | Hata - Suburban |
| ☐ Sector 1 | AOA | 30 | 0 | 35 | Antenna 2 | Hata - Suburban |
| ☐ Sector 2 | TDMA | 150 | 0 | 35 | Antenna 1 | Hata - Suburban |
| ☐ Sector 2 | AOA | 150 | 0 | 35 | Antenna 2 | Hata - Suburban |
| ☐ Sector 3 | TDMA | 270 | 0 | 35 | Antenna 1 | Hata - Suburban |
| ☐ Sector 3 | AOA | 270 | 0 | 35 | Antenna 2 | Hata - Suburban |

Compute Signal Files | View | Add | Edit | Delete

Compute All | OK | Cancel | Help

FIG. 4

SYSTEM AND METHOD FOR WIRELESS LOCATION COVERAGE AND PREDICTION

CROSS-REFERENCE TO RELATED APPLICATIONS

This patent application claims the benefit of the filing date of U.S. Provisional Patent Application Ser. No. 60/202,147, filed May 5, 2000 and entitled "PERFORMANCE ANALYSIS TOOL FOR LOCATION SYSTEMS", the entire contents of which are hereby expressly incorporated by reference.

FIELD OF THE INVENTION

The present invention relates to a system and method for wireless location systems. More specifically, the invention relates to a performance analysis software tool designed to predict the performance and geographical coverage of wireless location systems.

BACKGROUND OF THE INVENTION

Various location determining systems (LDS) are used to determine the location of a mobile user. For example, a Global Positioning System (GPS) typically uses a set of twenty-four orbiting satellites to allow ground-based users to determine their locations. These systems provide the user with location information based on LDS such as GPS data. Some location systems include LDS elements integrated into a cellular phone, while others have equipment added to the wireless infrastructure.

Designing a location system has been cumbersome and involves manipulation and analysis of a variety of information. Location sensor density and geometry are extremely important to obtaining acceptable location data. For example, Angle of Arrival (AOA) techniques require sensor information from a minimum of two sites to obtain a location, three to estimate the quality of a location and a minimum of four to identify and reject severely corrupted (multipath) data from one site. Time Difference of Arrival (TDOA) techniques (both at the sites and in the handsets) require sensor information from a minimum of three, four, and five sites for the same capabilities. Factors such as the type of service area to be covered (rural vs. urban) or the characteristics of the wireless network (existing cell site densities, geometry of cell sites with respect to each other and areas to be covered, restrictions on antenna placement, availability at cell sites, etc.) are all factors affecting location performance and are incorporated in this software platform.

The geometry of the site infrastructure has a major impact on the quality of the locations. Geometric Dilution Of Precision (GDOP) plays an important role which must be considered. An extreme example of poor geometry is found along (relatively) straight highways between major cities. In these cases, cell sites are often located in a string near the highways providing cellular/PCS coverage only to the highway. An AOA location system with sensors located only at the sites will only be able to locate a mobile set as being between two highway sites. TDOA systems will only be able to locate the mobile set along a hyperbola intersecting the highway. This is at least better information if one can assume that the mobile set is on the highway and not on a nearby farm-to-market road. Even this would require a unique algorithm for use only in these areas. Note that a combined AOA/TDOA system would be able to provide location services under these circumstances.

Location systems have coverage requirements that conflict with those of Cellular/PCS networks. For example, an objective of a cellular/PCS design is to limit the radio coverage of a given base station. A location system, on the other hand, requires that each receiver site "see" (i.e., receive a useful signal) well beyond the limits of a single base station. A location system or technique generally operates the best, i.e., it offers the best accuracy for the highest percentage of the time, when it has an abundance of sites that receive the signal from the phone. This means that the higher the number of receiver sites that "see" the mobile unit the better the performance.

As explained above, because of the divergent requirements of wireless communication and wireless location systems, a specialized design and analysis software tool is required for proper design of a location system. There are a number of Cellular/PCS coverage design tools available on the market but none provide the utility to predict a location system coverage.

Therefore, there is a need for a software tool for analyzing wireless location systems with a user friendly graphical user interface (GUI).

SUMMARY OF THE INVENTION

The software of the present invention predicts the availability and accuracy of locations determined by a variety of different techniques such as Angle of Arrival (AOA), Time of Arrival (TOA), Time Difference of Arrival (TDOA), and hybrid variations of these angle and time of arrival as well as signal strength based techniques. The tool is capable of performance analysis whether the pertinent measurements are performed in fixed sensors associated with the network infrastructure, or in the handset. The tool can also determine if the deployed location sensors meet, exceed, or fall short of providing the expected coverage and performance. The tool allows the location system designer to eliminate redundancies if not all sensors are needed and propose additional sites where location coverage holes are present. The software tool offers similar capabilities to location and monitoring services (LMS) networks.

In one aspect the present invention describes a method for analyzing performance of a wireless location system. The method includes the steps of storing data related to location equipment, wireless infrastructure, handsets, terrain map, and morphology map; generating a site radial file for path loss and time/angle error based on the stored terrain and morphology maps; computing a multi-site forward and reverse link signal strength map for determining coverage of the location system; generating a multi-site margin/error map from the computed multi-site forward and reverse link signal strength map and the stored data; and generating an error estimate map for the location system.

In another aspect, the present invention discloses a system for performance analysis of a location system comprising: means for generating a radial model and a radial map including a plurality of radial paths for a site from a stored raster map; means for selecting a propagation model from a stored plurality of propagation models for predicting a path loss along each radial path; at each point along a radial path, means for predicting accumulated angular errors and time delay errors; and means for generating an error estimate from the path loss and the accumulated angular errors and time delay errors.

BRIEF DESCRIPTION OF THE DRAWINGS

The objects, advantages and features of this invention will become more apparent from a consideration of the following detailed description and the drawings, in which:

FIG. 4 is an exemplary window within the GUI of FIG. 3;

DETAILED DESCRIPTION

Figure 1:
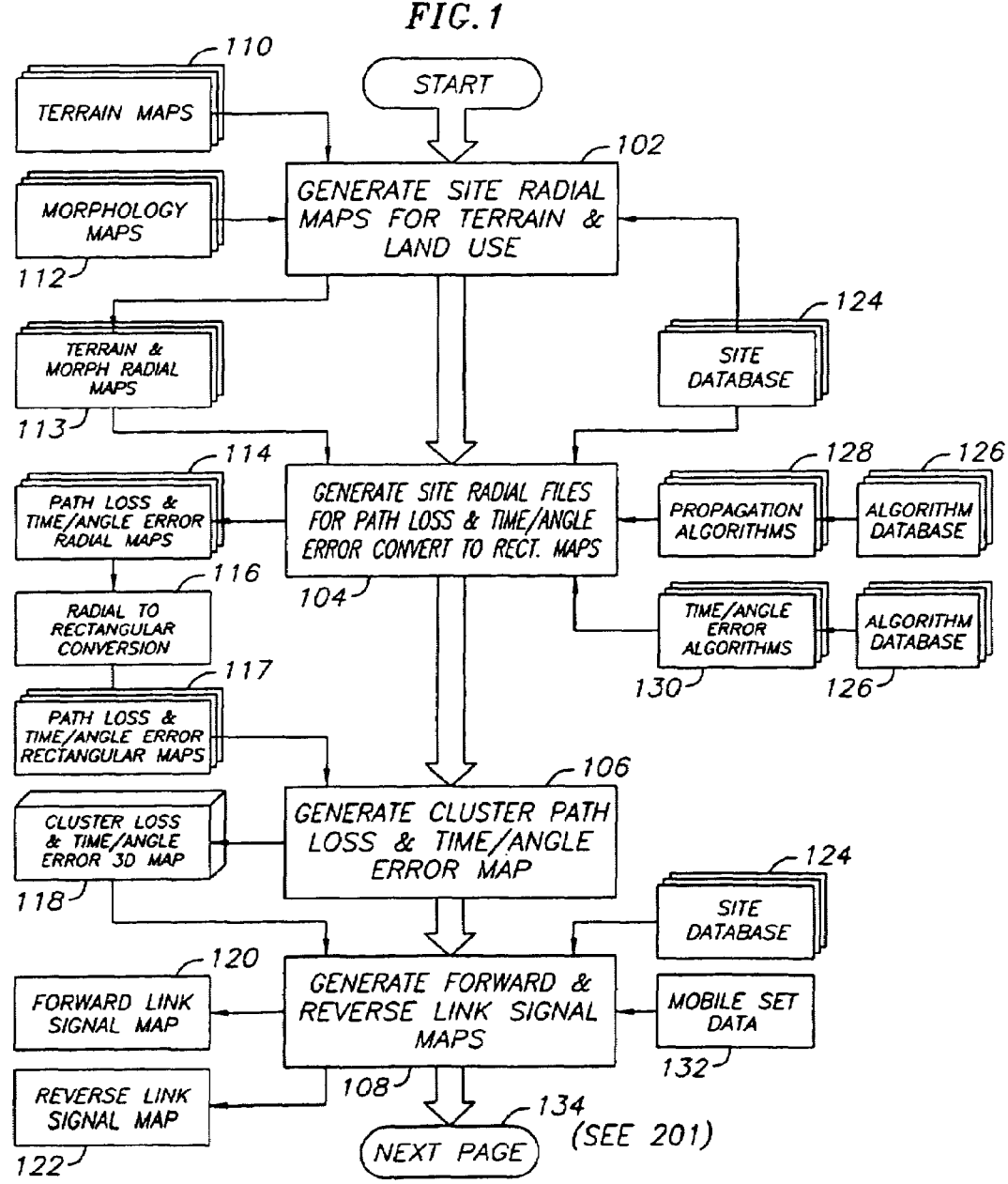
FIG. 1 is a simplified process flow, according to one embodiment of the present invention.

The present invention is a performance analysis software tool designed to predict the performance and geographical coverage of a wide array of wireless location systems. The tool applies to both network-based and handset based location technologies. These location techniques find broad application in Cellular and PCS networks, as well as in other wireless networks, including those for LMS. The software tool of the present invention is designed to work as a stand alone package or as a value added adjunct to wireless communication network design tools.

In one embodiment, the software tool of the present invention provides a windows based user interface that is fairly simple to use by a radio or design engineer. It also provides outputs in the forms of graphs, tables and reports for display and/or printing. In one embodiment, the tool runs on a Pentium-based, IBM-PC compatible machine running Windows NT 4.0. However, hosting on other platforms with a variety of different operating systems such as Linux or UNIX are also provided. The tool is modular in its structure to allow the gradual inclusion of capabilities and features, as well as to support on-going refinements. The typical user does not need to perform any programming, although hooks are made available to add modules by authorized technical users. Such development could be initiated based on the users' unique needs and requests.

The accuracy of the location determination is described by the expected location determination error (based on the mean square error). There are two widely used definitions for availability, and both capabilities are provided by the tool. In one, availability is determined by whether location determination is feasible at all or not. This relates directly to the minimum number of location sites (sensors) that "cover" a specific point under consideration on the map. (The minimum number of sites required to yield a location varies from one technique to another and is described briefly below for the different techniques.) In the second definition, availability is whether a location system statistically provides a location accuracy that meets a pre-selected accuracy threshold for example, 100 m over 67% of a given area.

In the family of network or infrastructure based location techniques, the position determination is performed by means of sensors that are placed at fixed locations, most typically co-located with the wireless cell sites.

For example, AOA sensors include specially designed antennas mounted at cell sites or other propitious locations to measure the angle of arrival of the mobile signal. Because the wave front arrives at the differently positioned antenna elements at slightly different times, the phase measured at each element relative to the others is different. Angle of arrival is calculated from these differing phase measurements using a specially designed receiver and is delivered to the location determining system controlling element as azimuth from true north (or other fixed directional reference).

The intersection of the rays formed by the reported azimuths provide the location of the caller. A major advantage of AOA position finding is that only two sites are required to obtain a position. Continuous system calibration is also unnecessary. AOA systems, however, are particularly sensitive to wave reflections caused by multipath in the urban environment. Their accuracy degrades also as the distance between the transmitter (e.g., the handset) and the AOA sensor increases.

In TDOA, the difference in the arrival times at multiple receiver sites of a signal emitted from a transmitter is used to calculate the position of that transmitter. An advantage of the TDOA approach is that special antennas are not required—current site antennas may be used. The sensor typically contains the functions of reception (filtering, down-conversion), signal sampling and storage, demodulation of certain signals, and calibration. Continuous calibration or control of system timing accurate to 10's of nanoseconds is required to achieve the required time measurement accuracy.

A closely related technique to TDOA is TOA, which applies when the transmitter and receiver are tightly time synchronized.

In this case, the differential time alignment in TDOA is not required, and it is possible to measure the round trip propagation delay between a sensor and a handset, hence infer the range (distance) to the handset. TOA is normally used in conjunction with AOA or TDOA to broaden their applicability or enhance performance.

In hybrid angle and time techniques, the location system attempts to combine the performance advantages of AOA with those of TOA or TDOA, enabling, in theory, using only one or two sensors to detect the position of the transmitter (e.g., the caller's handset), even when poor geometry renders pure AOA systems ineffective. These hybrid systems also promise improved performance (location accuracy and coverage). The drawback is the increased complexity at each hybrid site and in system control.

Multipath pattern recognition is an approach which is not immediately related to TDOA, however it is often combined with AOA to improve its performance. Multipath pattern recognition entails comparing the signature of the signal received at various sensor sites with the that stored in a substantial data base containing the signatures created during extensive calibration runs spanning the area. Pattern recognition and classification algorithms are used to obtain the best match and the location.

This technique is better suited to long calls or mobile calls where a significant amount of filtering can be applied to discard erroneous matches.

In handset based approaches, the handset plays an active role in performing measurements and optionally computing the location. Systems pertaining to this family can be divided into the following three broad classes.

Enhanced Observed Time Difference (E-OTD) technique is essentially TDOA but with the measurements performed at the handset. The times of arrival of signals from the serving as well as neighboring cell sites are observed at the handset. This technique also entails the broadcast by the network of the differences between the actual time bases at the different cell sites in the area. This information is used by the handset to enhance the location computation if it is performed there. Alternately, the information on the OTD measurements performed at the handset could be transmitted back to the network where the location is computed. In either case, from a location determination stand point, the technique is similar in its performance to TDOA, but with distinct parameters relating to its implementation particulars. E-OTD has been the technique of choice for a number of GSM operators and infrastructure vendors.

Forward Link Triangulation (FLT) technique is essentially TDOA at the handset. This flavor of TDOA is most commonly applied to CDMA networks because of the tight timing constraints maintained on the pilot transmitted from each CDMA cell site. FLT generally uses these pilots from the serving and neighboring sites to perform a TDOA computation at the handset. Analogous to E-OTD, some calibration of the time base accuracies at the cell sites is performed and is disseminated over the air to the handsets.

GPS Based Location techniques rely on the presence of a GPS receiver or sensor in the handset. Pseudo ranges from GPS satellites are measured and used to obtain the location. The computation is performed either in the handset or at a server on the network side if the measurement information is transmitted back to the network. So called assistance data may also be transmitted from the network to aid the performance of the GPS measurements performed in the handset.

The tool of the present invention obtains the geographic coverage and performance of AOA and TDOA based location systems including their variations and hybrids, whether the measurements are performed at fixed sensor sites or at the handset. As such, traditional network-based AOA and TDOA, network-based hybrid AOA/TDOA, and E-OTD and FLT are all techniques whose performance is predicted by the tool. Techniques that apply to a CDMA network, such as FLT, require special handling in the program to account for CDMA's unique radio coverage prediction, but as far as location performance prediction, the same procedures and algorithms described in detail below are applied.

Although the detailed algorithms discussed above do not explicitly depict the case of GPS measurement in the handset, because GPS is a TDOA system with the transmitters in the sky, the same methodology described below is readily applied to predict the performance of those systems as well. Straight-forward extensions to the propagation, geometry and signal models used with terrestrial transmitters are applied in obtaining the performance for the GPS case.

Figure 15:
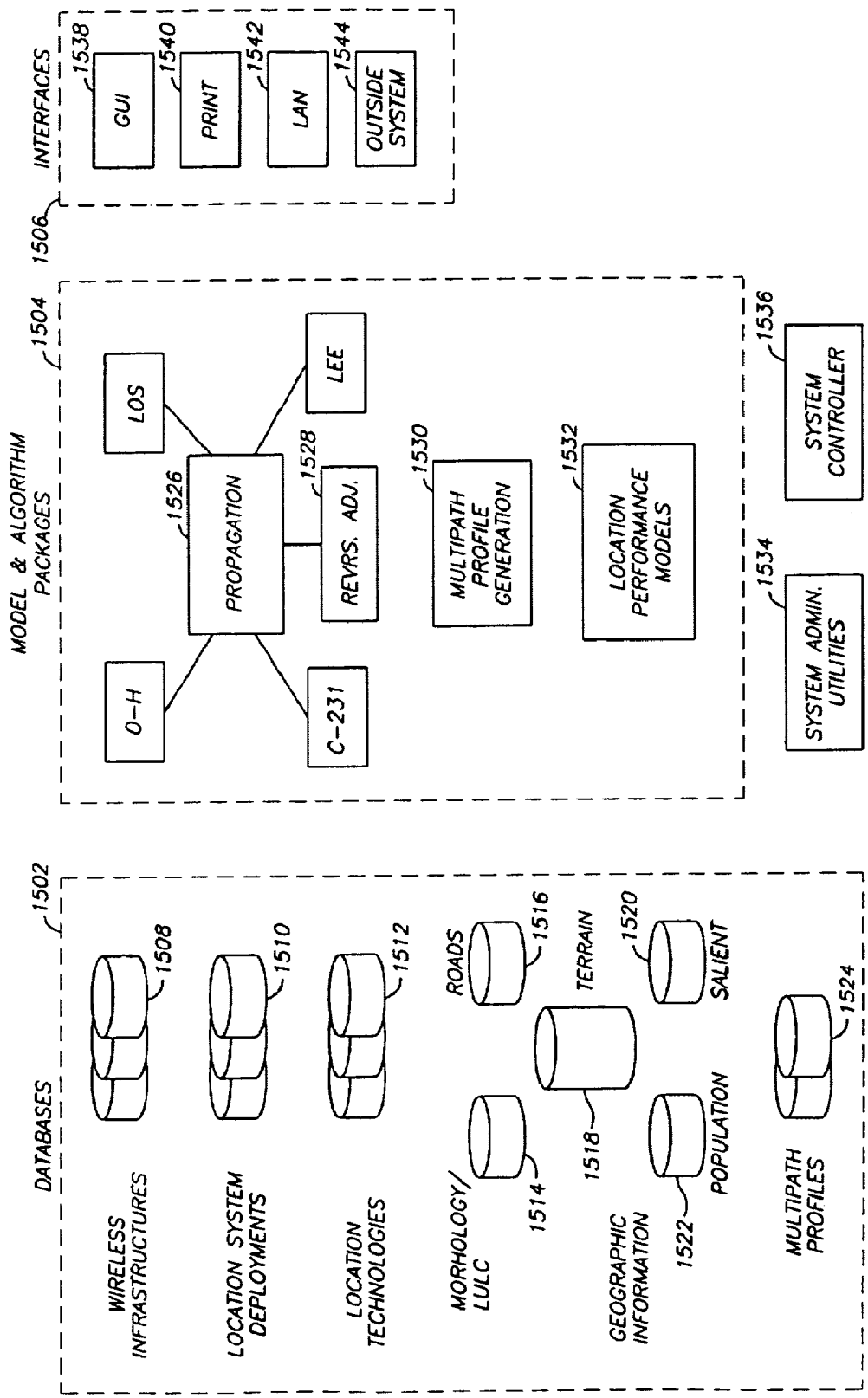
FIG. 15 is an exemplary block diagram of a software tool, according to one embodiment of the present invention.

FIG. 15 is an exemplary simplified block diagram of some components included in one embodiment of the tool of the present invention. As shown in FIG. 15, in this embodiment, the software tool of the present invention includes the following components: infrastructure technologies and environment databases 1502, model & algorithm packages 1504, and interfaces 1506. Databases 1502 includes wireless infrastructure databases 1508, location system deployment databases 1510, geographic databases, and databases for multipath profiles 1524. geographic databases include information for: terrain 1518, morphology/land use 1514, roads 1516, salient features 1520 (e.g., large towers or obstacles), and population 1522.

Model & algorithm packages 1504 include multipath profile generation/characterization algorithms and multipath profile databases 1530, location technology databases and location system performance models 1532, propagation algorithm databases 1526, and reverse link adjustments 1528.

Interfaces 1506 include GUI 1538, printing module & interface 1540, LAN interface 1542, and outside system interface 1544. System administration utility module 1534 handles the system functions controlled by a system administrator, such as system access control using a password system. System Controller 1536 provide a variety of system control functions.

In one embodiment, the software tool supports the entry, reading, or importing of the specifics of a target cellular or PCS infrastructure. This wireless infrastructure data includes: air interface type; cell site locations (latitude and longitude); site elevation AMSL (maybe computed automatically from terrain); sector height (above surrounding terrain); number of sectors; antenna gain; TX and RX pattern propagation model type; downtilt; number of channels; transmit powers; and power control window upper and lower limits.

The default mode of data entry is the keyboard/GUI. However, other modes of data entry are possible. In one embodiment, each cell site of an infrastructure is assigned a number and each of its sectors is assigned another number to distinguish antennas that may be physically separate (e.g., on different sides of a building). In one embodiment, the tool includes separate databases for each target cellular/PCS infrastructure.

In one embodiment, the software tool supports entering, reading, or importing of the location system infrastructure deployment information. The information pertaining to the location system deployment includes: location system type or name; unit type (if multiple receiver types or configurations are available); location receivers' antenna category (same as wireless network or not); location system antenna locations (latitude and longitude or cell site number if same antenna); antenna type (if not same as cellular); number of antenna units at a given installation; location system antenna elevation; location system antenna height; and cabling losses. In one embodiment, the tool includes separate databases for each location system deployment. Information pertaining to a given location technology that is not deployment (placement) specific is maintained in another database called the Location Technologies database.

In one embodiment, the tool reads and maintains database with parameters specific to various location technologies. Each databases contains information specific to one location technology or one release version of it that is under investigation. This non-placement specific information is retained in the location infrastructure database. Some of these parameters include: type of technology; antenna types (gains and/or patterns); receivers' sensitivities and noise data; receiver bandwidth; integration time(s); known receiver biases; any known or estimated receiver jitter; quality indicators of receiver or receiver type; and quality indicators computation (if available).

The tool contains location system performance algorithm packages to enable predicting system performance. For every location technology identified above, performance computation algorithms are developed using both theoretical and empirical formulas. Distinct modules within each package are possible to compute the effects of specific phenomena on the subject technology, for example, GDOP. The user is able to adjust certain parameters in the equations to support "what if" and sensitivity analyses. These algorithms typically take inputs from multiple databases, including: infrastructure, geographic, multipath profile, and location technology. They also exercise or cause the execution of the propagation package and wireless control algorithms. The outputs of the performance algorithms are expressed in several ways, including: average and RMS errors, probability of missed detection, number and identity of location receivers observing a mobile at given thresholds, and coverage availability (assuming these thresholds). In one embodiment, the results are made available in tabular formats, graphical formats using data layers, and in summary reports.

The tool also supports the entry, reading, or importing of the specifics of mobile units. This data is primarily the unit type and model. For a number of models, default characteristics are initially read and then maintained into the database. The characteristics include: peak transmit power; power control range; support of discontinuous transmission; speech specification (analog or speech coding rate); and support of data services, if any.

The tool has the ability to read and store the terrain information for a certain area determined by its corner latitude and longitude coordinates. The tool is also able to display this information as a raster data layer. Maps from the USGS or other private sources conforming to standard formats are supported. For example, both one degree and 7.5 minute arc maps are supported. 300 m and 100 m terrain maps, among others, are also supported. The tool also has the ability to read, store and display morphology type maps. One such source is the USGS Land Use Land Cover (LULC) data maps. The tool also makes it possible to edit and design custom morphology maps. It displays this information as a raster data layer.

The GUI allows simple entry of many information elements through dialogue windows. However, some elements may also be obtainable from sources other than the GUI, e.g., an external system like a switch or a CD-ROM. Preferably, each database has a set of menu-driven dialogue windows that enable entering and/or editing, as appropriate, their information elements. For example, nominal transmit power, receiver site coordinates, antenna height, receiver noise figure, land use/morphology category, and so on. The dialogue windows enable the creation of a new wireless or location site and the entry of its parameters into the appropriate databases. Preferably, each model within a package has associated with it a dialogue window to specify, enter parameter into, or edit (as appropriate) the model. Certain core parts of the models require administrator access for modification.

Figure 3:
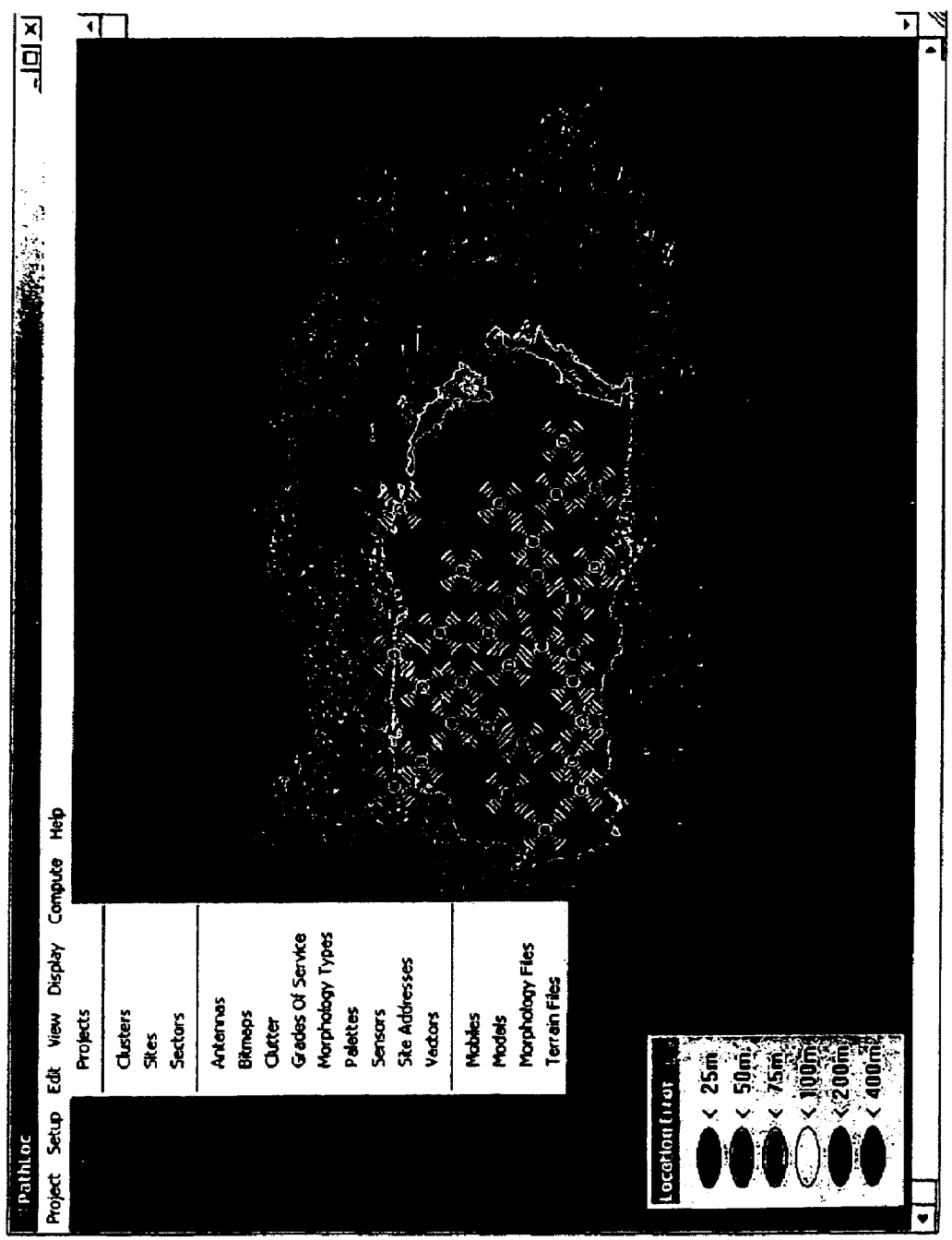
FIG. 3 is a picture providing an example screen of a GUI, according to one embodiment of the present invention.

Prior to performance prediction, two distinct types of site sectors are defined in a project within the tool: (1) wireless sectors (e.g., Cellular, PCS, ESMR), and (2) geolocation (or simply location) sectors. Sites may be comprised of either wireless sectors, geolocation sectors, or both. A unique graphical user interface (GUI) allows the user to define the project, enter and edit the particulars of both the wireless and location sites, and otherwise input and manipulate all the information that the program may need to provide the predictions sought by the user. A picture providing an example screen of this GUI is shown in FIG. 3. An exemplary window within this layered GUI, called the Site Editor, is shown in FIG. 4. The Site Editor provides a mechanism for the user to input, edit and select wireless and geolocation site information.

Furthermore, the tool is able to read, store and display interstate, major and secondary roads. This data may be stored as line or curve rather than raster data. It is possible to display and/or overlay this information with/on other data layers. The tool is capable of distinguishing between Interstate highways and other roads. The tool reads, maintains and displays population density raster maps. In one embodiment, data based on US census information is used. Also, it is possible to read or define information elements that specify certain salient features in the area under investigation. Examples include large transmitters, tanks, obstructions, airports, etc.

The software tool of the present invention begins with wireless (e.g., cellular) site or area coverage prediction methods, and adds considerable new modeling to arrive at a prediction of geolocation network performance. An exemplary process is illustrated at a top level in the flow charts depicted in FIG. 1 and FIG. 2. These charts show eight major "boxes" or steps culminating in obtaining the desired location error map. The description below will follow these top level charts and will elaborate on the eight main steps, providing details on their algorithmic contents with a more detailed flow chart for each step.

Figure 2:
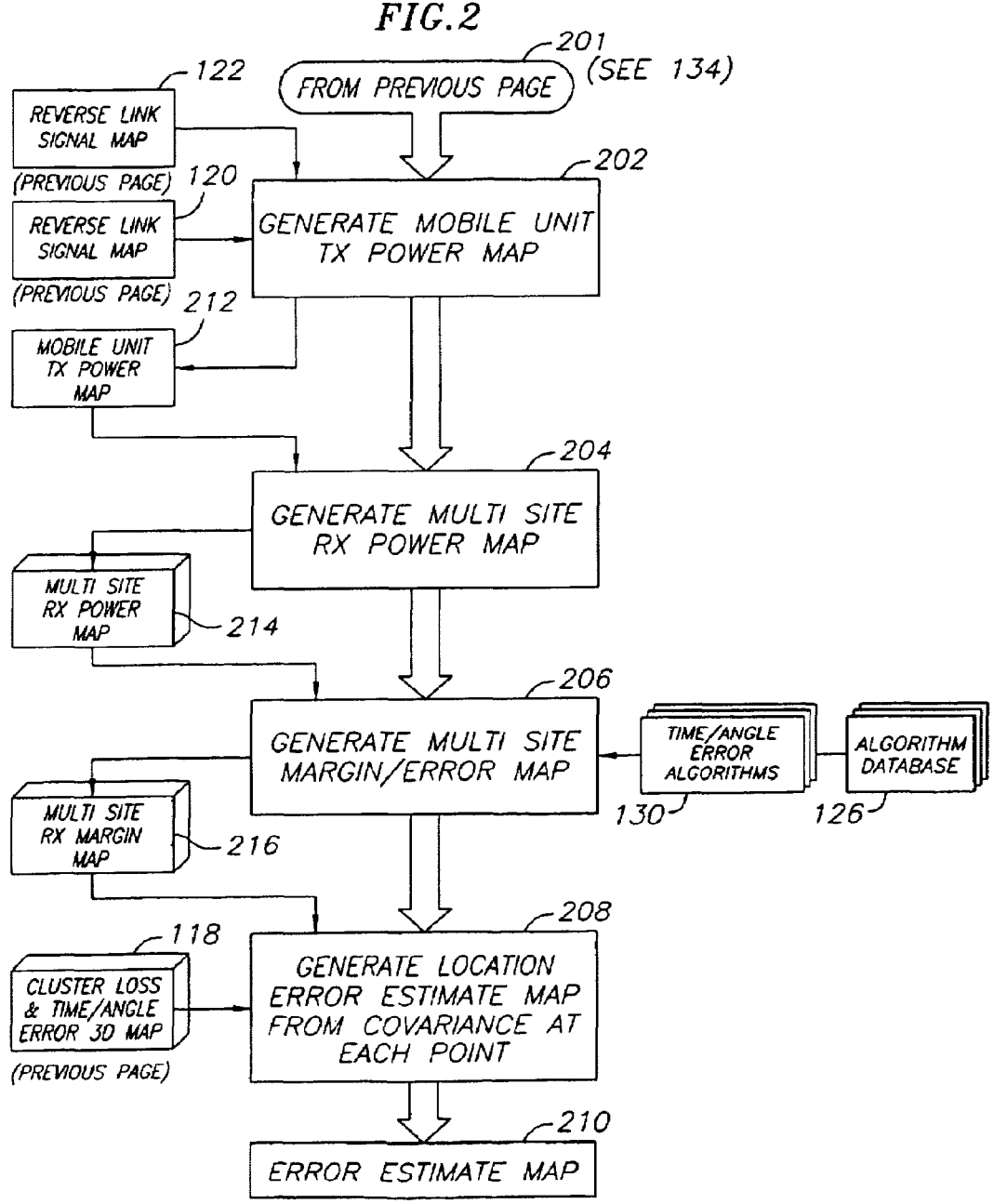
FIG. 2 is a simplified process flow related to FIG. 1, according to one embodiment of the present invention.

FIGS. 1 and 2 are exemplary process flows according to one embodiment of the present invention. In block 102 of FIG. 1, site radial maps for terrain and land use are generated. This entails developing a radial model and a radial map, centered on the site, for the terrain and morphology (land use) from common raster maps. The details of this process are shown in the exemplary flow process of FIG. 5.

At each point along a radial path, a combination of accumulated angular errors and time delay errors (for AOA, TDOA, their hybrid location techniques) are predicted. The combined path loss and accumulated error radial maps are then converted to square raster maps, one for each cellular site and each geolocation site, as shown in block 104. The details of this process are shown in the exemplary flow processes of FIGS. 6 and 7.

A cluster of sites of fairly arbitrary size is also defined. The maps calculated for the individual sites are then combined into a single, combined raster map for the cluster in block 106. These maps contain at each point, the path loss for the best wireless server and the error data for the geolocation sites with the highest received signals. Up to N geolocation sites can be included, where N is currently 8 by default but can be changed. Details of the steps of block 106 are further described in FIG. 8.

In block 108 (explained further in FIG. 9), both forward and reverse link signal strength maps are computed for the cellular network to determine the presence of cellular coverage. From these maps, a map of actual cell phone transmit power is calculated. The receive power margins are then computed for the geolocation sites (up to N as described above) in block 202 (explained further in FIG. 10).

In block 204, a multi-site receive power map, containing the signal margins at each map point, is then constructed for these location sites. The additional angle and/or delay noise at each point due to geolocation sensors receive noise are then estimated. These errors are combined with the noise previously estimated from the terrain/land use environment and already available in the cluster raster map in block 206 (explained further in FIG. 11).

In block 208, at each map point, an error covariance matrix is then generated from the up to N angle and/or time error estimates. The semi-major axis of the error ellipse is derived from this matrix, to determine the error estimate, as shown in block 210 (explained further in FIG. 12).

The error results are then output in the form of a display map covering the cluster or metropolitan area. Color coding is keyed to the size of the estimated error. Alternately, the estimated probability that the error will meet a specified criterion is displayed. The tool is interactive in nature and allows the user to conduct a number of what-if scenarios, to optimize location site placement and location system performance.

Figure 5:
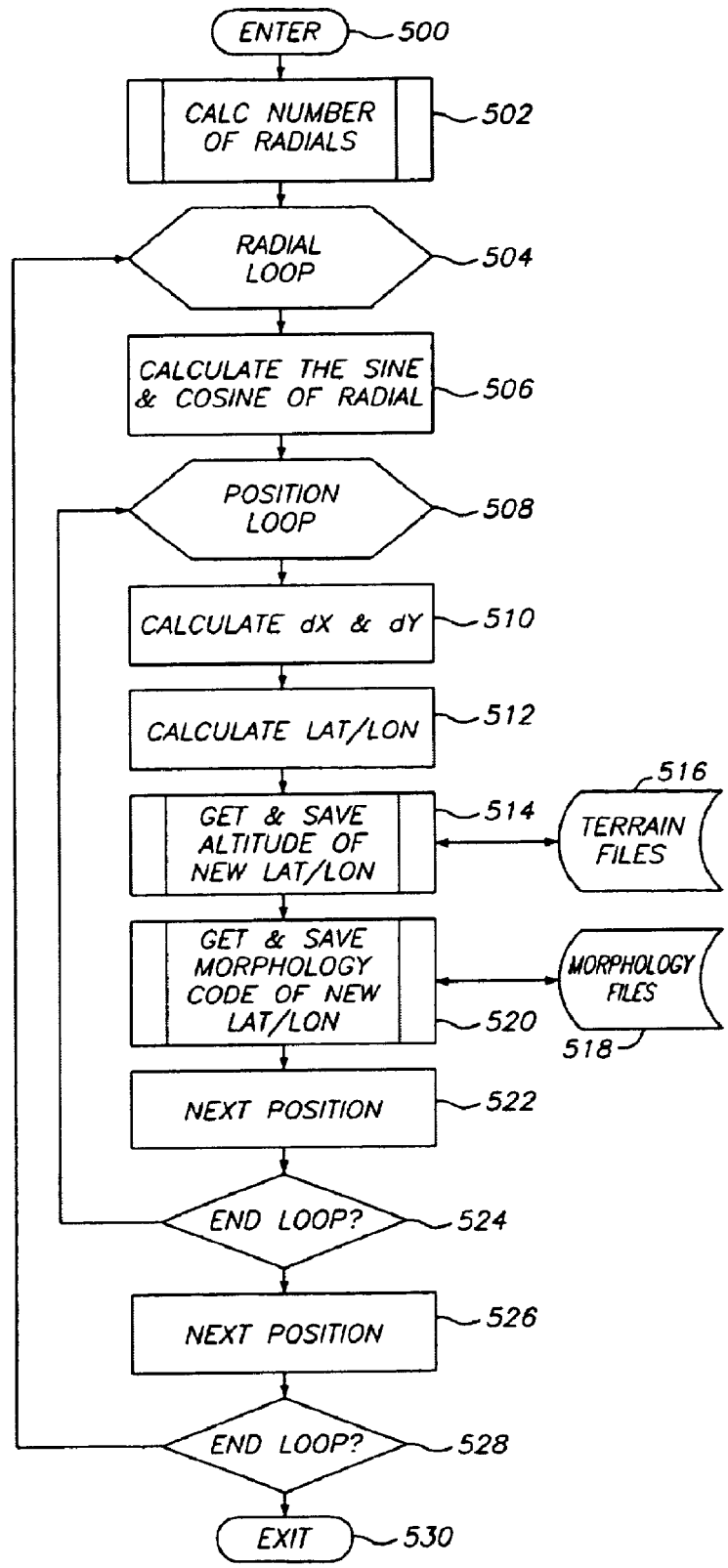
FIG. 5 is a simplified process flow for generating site radial maps for terrain and land use, according to one embodiment of the present invention.

Referring now to FIG. 5, the number of radials required to adequately represent the site's signal propagation is calculated in block 502. This number is based on the resolution of the original terrain file data and the (entered) calculation radius for the site. The resolution along each radial is typically the same as the resolution of the terrain file data. Next, the latitude and longitude are calculated in block 512 for each point (block 508) on each radial (block 504). This requires the sine and cosine of the azimuth of the radial (block 506 to calculate the horizontal and vertical distances from the site (center) to the point on the radial, shown in block 510.

From these distances, the local radius of the earth, and the site's coordinates, the longitude and latitude of a point on the radial are determined in block 512. The terrain altitude for the point (defined by its latitude and longitude) is obtained in block 514 from the original terrain file 516, and a morphology code is obtained in block 520 from the original morphology files 518. The morphology code is an index into a table that contains an effective height, loss, and effective obstruction width for each type of land usage (urban, light suburban, forest, open land, etc.). This information is then stored together in radial format. This process is repeated for the next point (blocks 522 and 524) and the next radial (blocks 526 and 528).

The second major step for the top level exemplary process flow of FIG. 1 is to generate the radial files for path loss and for the time and/or angle error, as shown in block 104. In one embodiment, the tool includes a set of propagation models that can be selected by the user for the purpose of computing the path loss. The selection may be based on a sector, or larger areas. The following models are some examples of the propagation model selections: Okumura-Hata (cellular band), Cost 231 (PCS band), Line of Site, Lee's model with effective antenna height, Fresnel zone corrections for paths partially obstructed by terrain. Other propagation models may be easily added to the tool. The user has the ability to override key default parameter values in the model selected; for example, the intercept of the Hata model (as seen on a log—log scale).

Furthermore, the design of the propagation module enables importing measurement data in a standard file format to perform least square fit type computations. The results of these computations are used to adjust the parameters of the selected propagation model over a certain application region to be defined by the user. Another capability of the tool is to automatically select a permissible combination of models (e.g., O-H and LOS) on a per-pixel, per site basis. For each propagation model made available on the forward wireless link, a set of adjustments are implemented to allow its use for predicting the reverse link path loss. The details of this multi-faceted process are depicted in the exemplary process flow of FIG. 6.

Figures 6A, 6B:
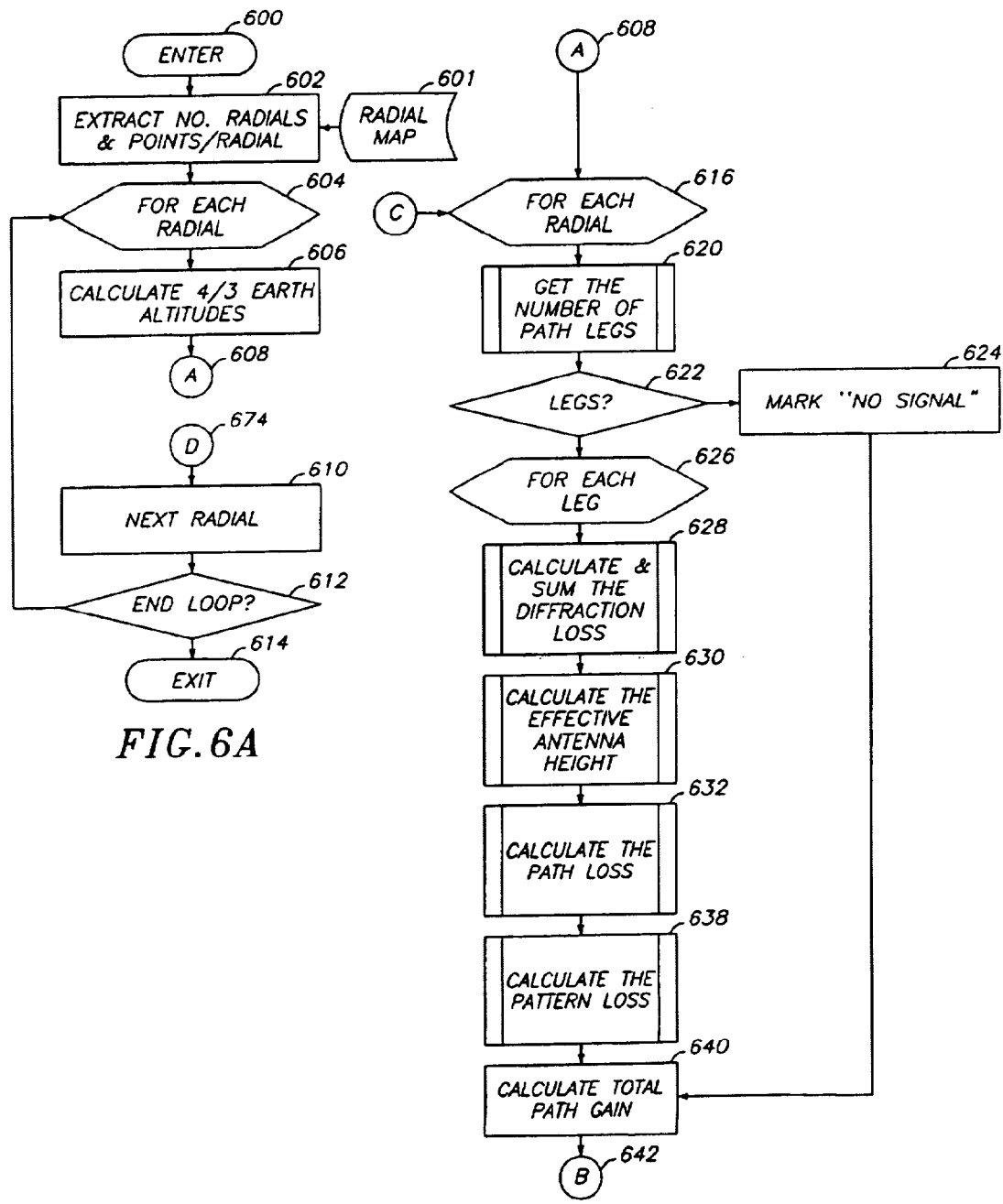
FIG. 6 is a simplified process flow for generating site radial maps for path loss and time/angle error, according to one embodiment of the present invention.
Figure 6C:
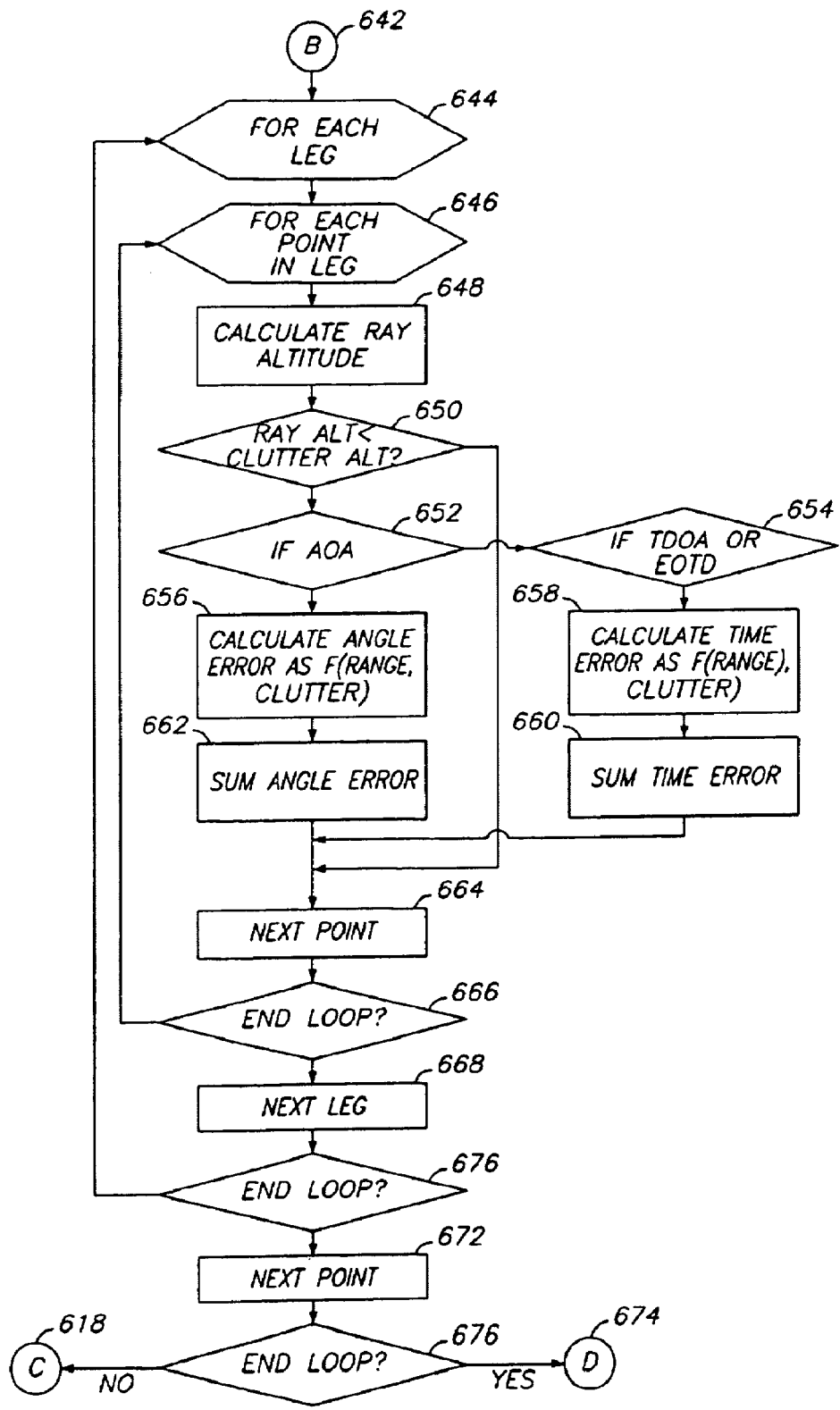

Referring now to FIG. 6, several salient sub-steps are shown including: spherical (4/3) earth computation (block 606); propagation model computation to generate the path loss including the effects of diffraction and antenna height (blocks 628 and 630); computation of loss due to antenna pattern (block 638); computation of the angle errors (block 662) or time errors (block 660) that result along the radial paths in an AOA or TDOA based system, respectively.

For each entry along each radial route, the total number of obstructions is determined and the characteristics of each path leg from site to obstruction to other obstruction(s) to mobile unit are determined in block 620, and the accumulated diffraction loss is calculated for each obstruction in block 628. Diffraction loss is calculated similar to the method described in "The Mobile Radio Propagation Channel, Parsons, Halsted Press, 1992, pp 48–49," the contents of which are expressly incorporated by reference herein, following the "The Epstein-Peterson method".

For each point (block 616), the number of path legs are obtained in block 620. For each path leg (block 626), the diffraction loss is calculated and summed, as shown in block 628. From the last path leg, and the average slope of the land just before the mobile unit, the effective height of the site antenna is calculated in block 630. Both the ray from the mobile and the slope of the land just before the mobile are projected back along the last leg to the site antenna position and the difference in altitude is used as the effective antenna height. From this and the total distance to the mobile unit, the nominal path loss is determined in block 632 from a selected propagation model 634 (e.g. Hata, Cost 231).

A host of standard propagation models are made available to the user to predict the path loss along each radial. Hybrid variations of these models are also permissible in the tool. For example, Okumura-Hata (O-H) is one typical model widely used for urban or suburban propagation. The O-H model includes parameters that could be adjusted and selected by an expert user to adapt it specifically to certain propagation environments, e.g., an unusually open area. The tool's user friendly GUI permits the user to select and edit these detailed parameters of the propagation model. Other models that are more appropriate for specialized propagation environments, e.g., for very high sites, can be used, at the user's option, instead of a standard O-H model.

This propagation model is then modified by the morphology loss at all points where the ray penetrates the morphology. Using the azimuth of the current radial and the elevation to mobile unit or first obstruction, if any; the stored antenna pattern 636; and the antenna's azimuth and tilt, the antenna pattern loss is determined in block 638. This loss is added for the total modeled path loss in block 640.

At each point along a radial path (blocks 644 and 646), a combination of accumulated angular errors or time delay errors are computed as applicable (for AOA, TDOA, and hybrid location techniques). The angular measurement error is accumulated along the propagation path below the morphology (clutter) height based on an equivalent obstruction size, an equivalent obstruction density, and the distance from the sensor antenna. The steps in blocks 648 and 650 are used to determine whether or not each of the rays is impacted by the clutter. The type of the algorithm to be used for the analysis is determined in blocks 652 and 654.

In block 656, individual AOA errors are calculated by calculating the angular error from the antenna caused by the path diffracting around the obstruction (or reflecting off an adjacent obstruction). In block 658, TDOA errors are calculated by subtracting the direct path from the site from the path around the obstruction to the mobile unit. Each error is squared for accumulation as a variance in blocks 660 for TDOA/EOTD and block 662 for AOA.

The equivalent obstruction sizes and densities are abstract terms arrived at through integrating field measurements into the model and are different for each morphology (land use) type. The resolution along the radial path remains consistent with the terrain/morphology database. Next point and next leg is selected in blocks 664 and 668, respectively. If the end of loop is not reached (block 676), next point is selected in block 616. If the end of loop is reached, next radial is selected for analysis in block 610.

Figure 7:
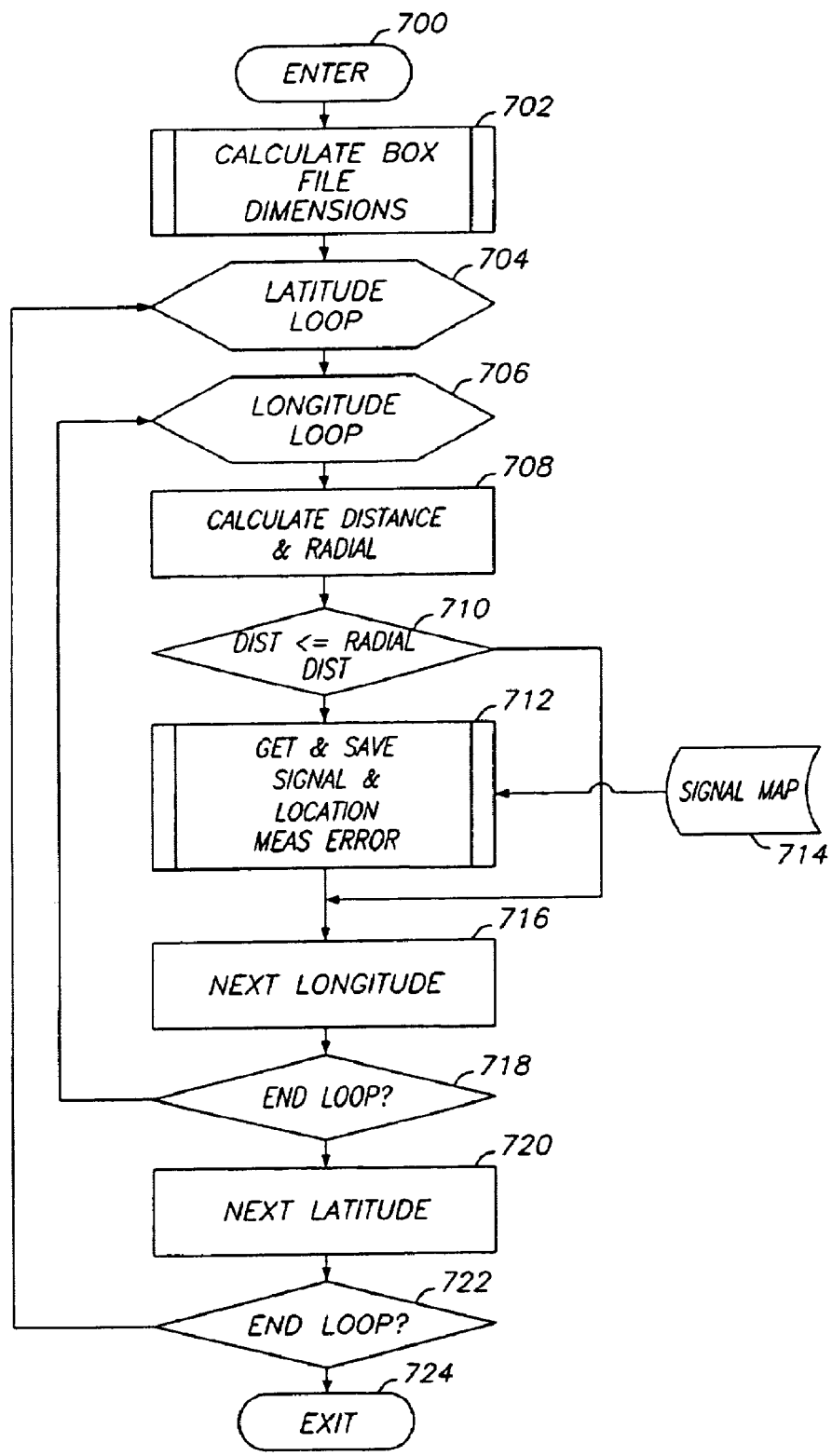
FIG. 7 is a simplified process flow for generating rectangular maps from radial maps, according to one embodiment of the present invention.

The next major step in FIG. 1 is to convert the combined path loss and accumulated error radial maps to square raster maps, one for each cellular site and each geolocation site. In one embodiment, the details of these conversions are performed as shown in FIG. 7. In FIG. 7, first, the box map dimensions are determined to fit the radial signal file and the box map is set to the same resolution as the radial distance resolution, as shown in block 702. From here, a signal map entry is obtained (block 708) for each latitude and longitude (blocks 704 and 706) in the box map. The signal data (path loss and error) is then stored in the box map's raster format, as shown in block 712.

It is quite common for radio engineering and location system planners to focus their analysis on a subset of the sites that have been initially entered into the project prior to processing. This is, for example, to examine in more detail a specific area or section of a city, or to conduct what-if analyses. The cluster size is fairly arbitrary. The rectangular maps calculated in the previous step for the individual sites are now combined into a single, combined raster map for the cluster. The details of this procedure are depicted in the exemplary process flow of FIG. 8. The cluster maps contain at each point the path loss for up to N sites as their coverage usually overlaps.

Figures 8A, 8B:
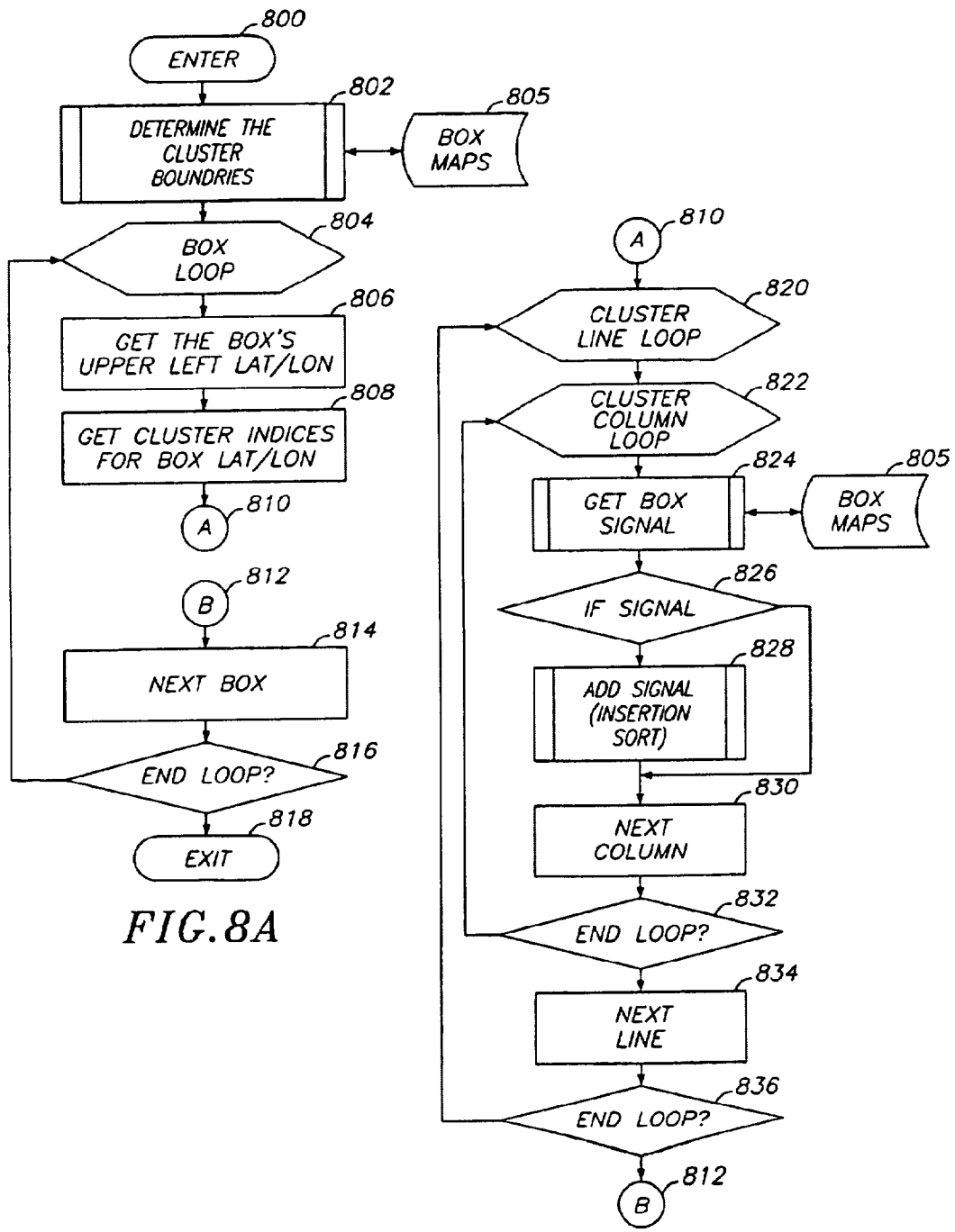
FIG. 8 is a simplified process flow for generating a cluster map, according to one embodiment of the present invention.

Referring to FIG. 8, based on the user's input, the boundaries (latitude and longitude) of the overall cluster are determined from the site box map 805 sizes and positions, as shown in block 802. Then, the box map is aligned with the cluster map in box loop of block 804. This is done by obtaining the box map's upper left coordinate (latitude and longitude) in block 806 and determining where this position is in the Cluster map, as shown in block 808. Inserting the box data into the cluster map starts at this point. At each point in the cluster map (blocks 820 and 822), the signal is extracted from the box map 805 in block 824 and is inserted into the cluster map in block 828. In this process, the site signals are ordered by received signal strength, the best wireless server being first in the list. These are the sites with the highest signal levels received from the handset (or vise-versa at the handset). The default value for the number of sites N is 8, but can be changed and selected differently by a user. The resolution of the cluster maps is user selectable but is typically the same as the original terrain maps.

Figure 9:
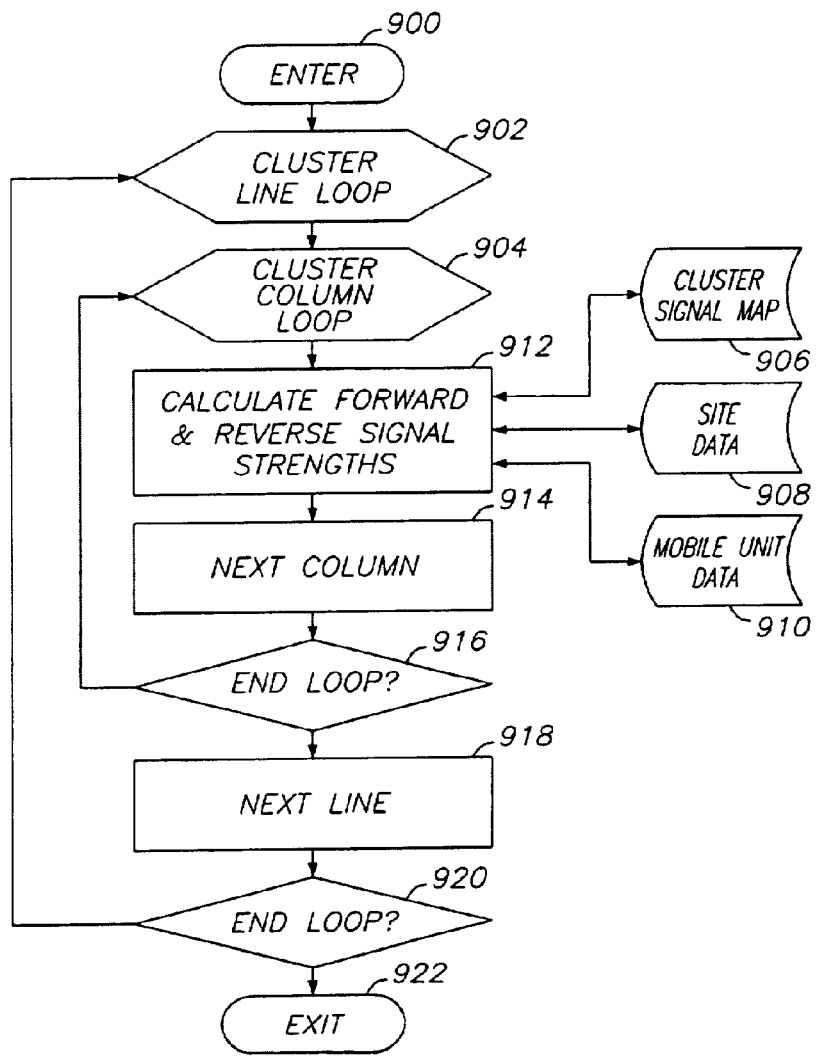
FIG. 9 is a simplified process flow for generating forward and reverse link signal strengths, according to one embodiment of the present invention.

Referring back to the high level exemplary process flow of FIG. 1, the next step is computing the forward and reverse link signal strength maps for the best server in the cellular network, as shown in block 108. This is to determine the presence of cellular coverage. (This implies that the tool also determines the likely/best server for a given mobile's location.) As shown in FIG. 9, for each line in the cluster map (block 902) a signal strength is obtained. The path loss is subtracted from the effective radiated power (ERP) of the best server site to obtain the forward signal strength. Alternatively, the path loss is subtracted from the maximum ERP of the mobile unit to obtain the reverse signal strength, as shown in block 912. The ERP of the cellular sites are obtained from the Site Data database 908 and the maximum ERP of the mobile unit from the mobile unit data database 910.

Full use of most of the propagation models for path loss computation requires the availability of terrain information. Nevertheless, In one embodiment, the tool has two modes: a no terrain mode and a full terrain mode. When no terrain information is available the user enters a height for the mobile manually. The overall heights of the cell sites is computed from manual input of site elevation AMSL plus manual input of an antenna height. When terrain data is available and accessible, the tool automatically computes the site and mobile user elevation from the coordinates manually provided and the antenna height entered.

Figure 10:
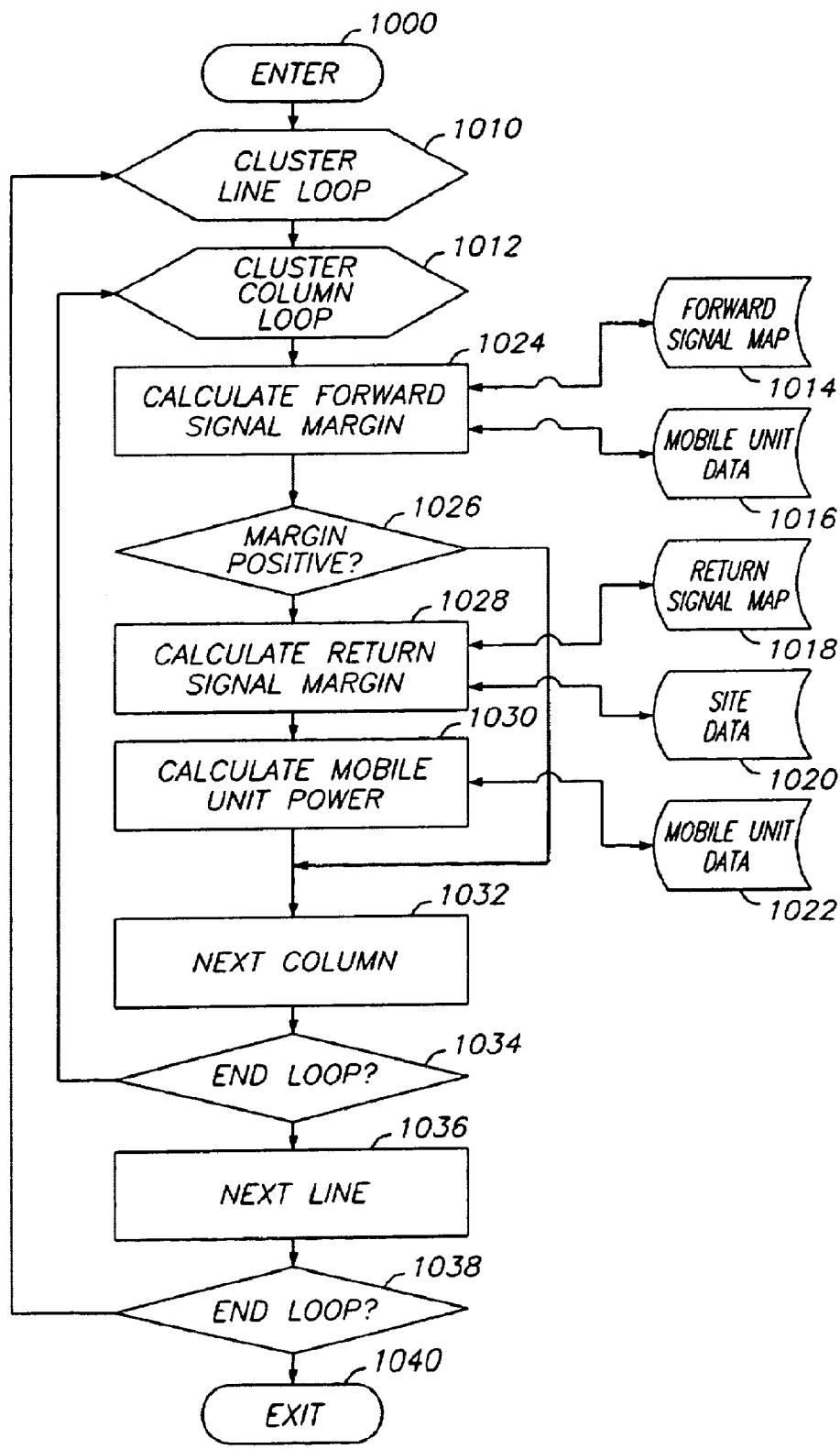
FIG. 10 is a simplified process flow for generating mobile unit transmit power, according to one embodiment of the present invention.

From the forward and reverse link signal maps (block 108), a map of actual cell phone transmit power is calculated in block 202. The details of this steps are shown in FIG. 10. For each cluster line (block 1010) and cluster column (block 1012), forward signal margins and return signal margins are calculated in blocks 1024 and 1028, respectively. From the forward signal map 1014 and mobile unit data 1016, path loss and mobile unit receive sensitivity is subtracted from the ERP of the best server site to obtain forward signal margin, as shown in block 1024. If this margin is positive (block 1026), from return signal map 1018 and site data 1020, path loss and site receive sensitivity is subtracted from the ERP of the mobile unit to obtain the return signal margin, as shown in block 1028.

In block 1030, the mobile unit power is calculated as the minimum power necessary to maintain the reverse link so long as both the forward and reverse margins are positive. Mobile unit power never goes below the minimum mobile unit power entered into the program. The computation takes into account the power control implemented in the wireless network and followed by the handset. Again, the particular parameters of the mobile unit are obtained from the mobile unit data database 1022.

As depicted in block 204 of FIG. 2, the receiver powers are now computed. The receiver power margins are also computed as described in the previous paragraph for the pertinent geolocation sites (up to N as described above). As shown in block 206, a multi-site margin/error map, containing the signal margins at each map point, is then constructed for the N location sites. This map is essentially identical to the cluster map discussed previously, except that the location sensor sites are used instead of the cell sites and the error data is recorded in addition to the signal margin data. Using algorithm database 126 the propagation algorithms 128, and the time/angle error algorithms 130, a computation is performed at this stage to include the additional angle and/or delay noise at each point due to geolocation sensors receive noise. These are based on sensor characteristics and signal margins. The details for these algorithmic steps are shown in FIG. 11.

Figure 11A:
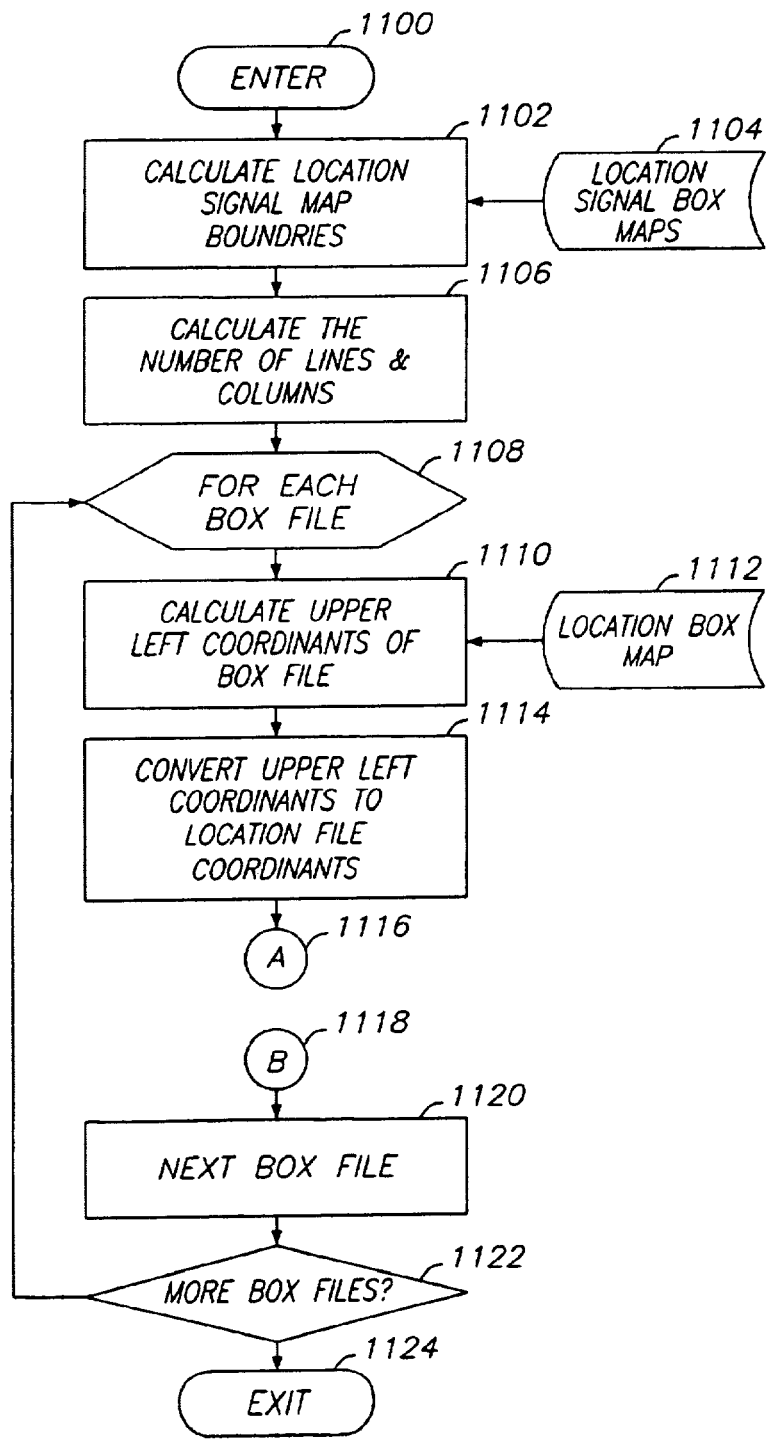
FIG. 11 is a simplified process flow for generating a multi-site time/angle error map, according to one embodiment of the present invention.
Figure 11B:
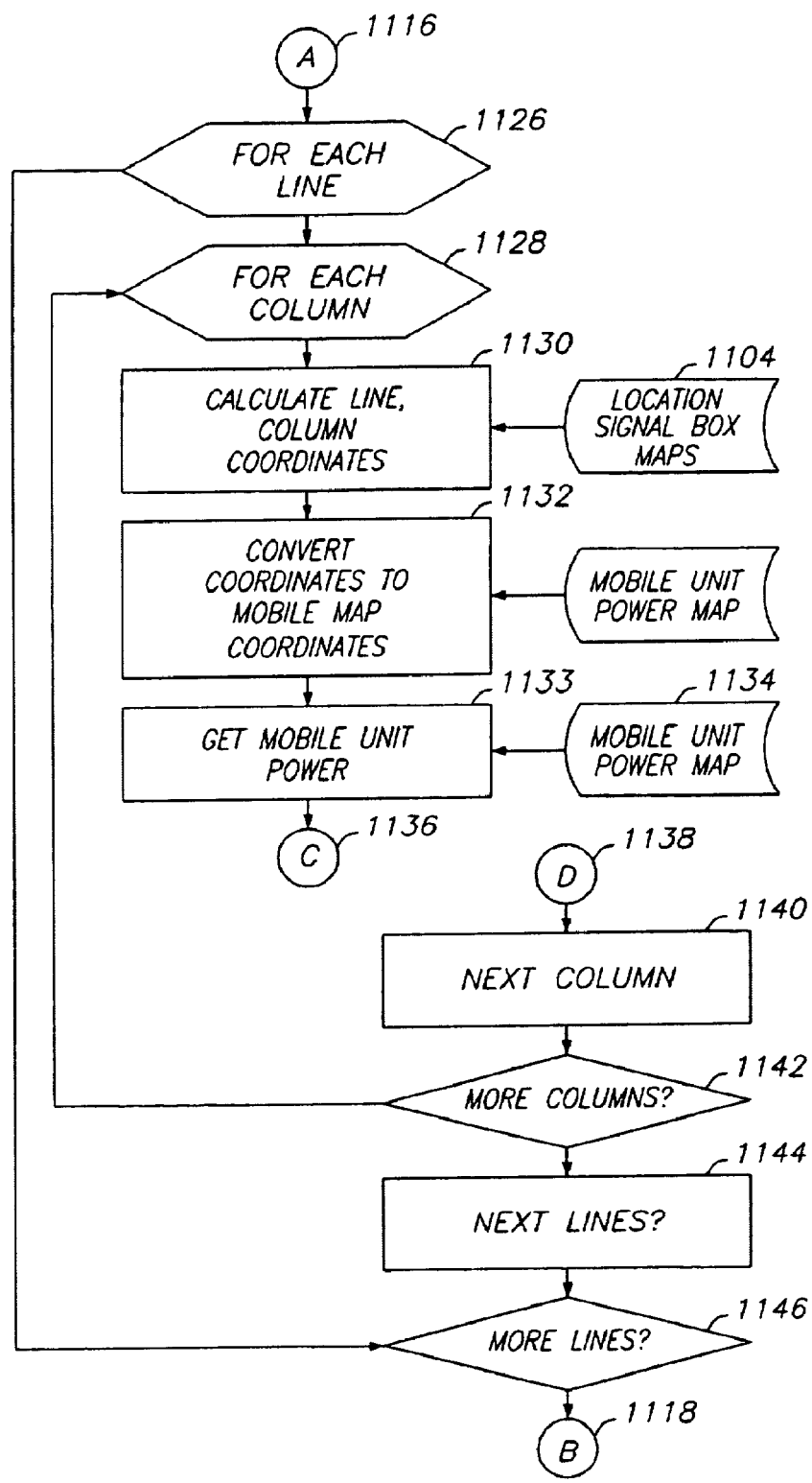
Figure 11C:
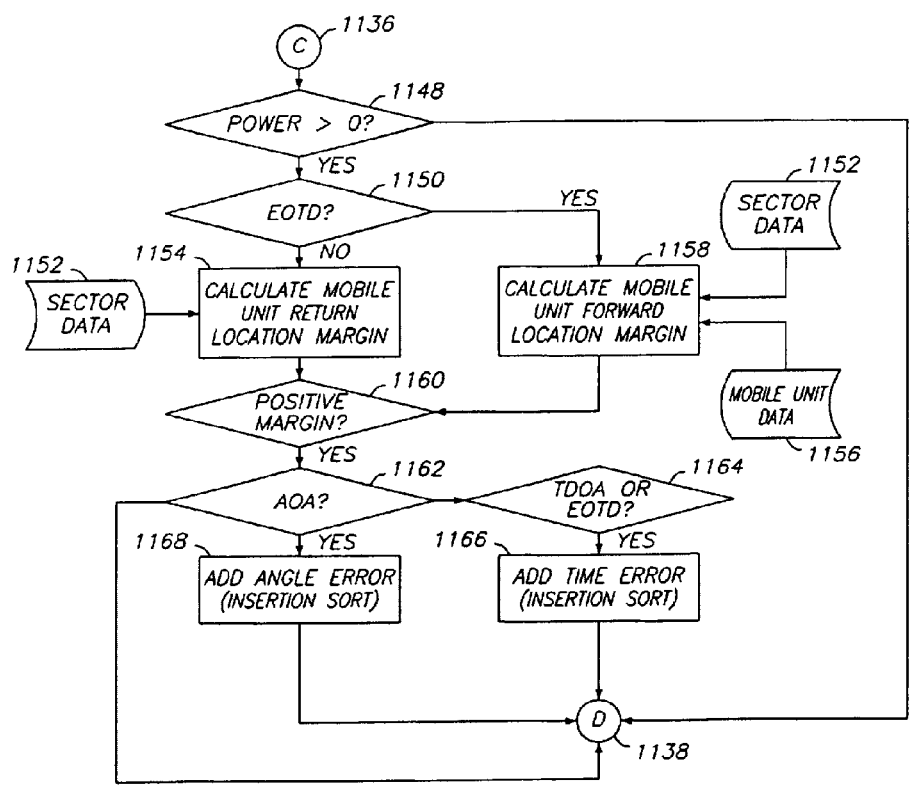

Similar to the exemplary process of FIG. 8, the boundaries (latitude and longitude) of the overall cluster are determined from the site box map sizes and positions using the location signal box maps 1104, as shown in block 1102 of FIG. 11. Then, the box maps within the overall cluster map are aligned with it. This is done by obtaining the box map's upper left coordinate (latitude and longitude) in blocks 1110 and 1114. Next, for each location in each box map (block 1126 and 1128), latitude and longitude are determined in block 1130. The latitude and longitude are then converted to the line/column coordinates used in the mobile unit power map, as shown in block 1132. The mobile unit power is then obtained in block 1133, similar to the process of FIG. 10.

Depending on whether the mobile unit is transmitting (because it has positive cellular link margins), then the signal margin to the location sensor (forward or reverse) is determined in blocks 1158 or 1154, respectively. If the margin is positive, then the appropriate error is added to the position by insertion sort in blocks 1168 or 1166 depending on the type of the location algorithm used (blocks 1162 and 1164). These location sensor related errors are combined with the errors previously estimated from the terrain/land use environment and already available in the cluster raster map.

The final computational step in FIG. 2 is to obtain at each map point an error covariance matrix from up to N angle and/or time error estimates, as shown in block 208. The semi-major axis of the error ellipse is derived from this matrix. This is the error estimate at any given point on the map. The detail of this step is shown in exemplary process flow of FIG. 12.

Figure 12:
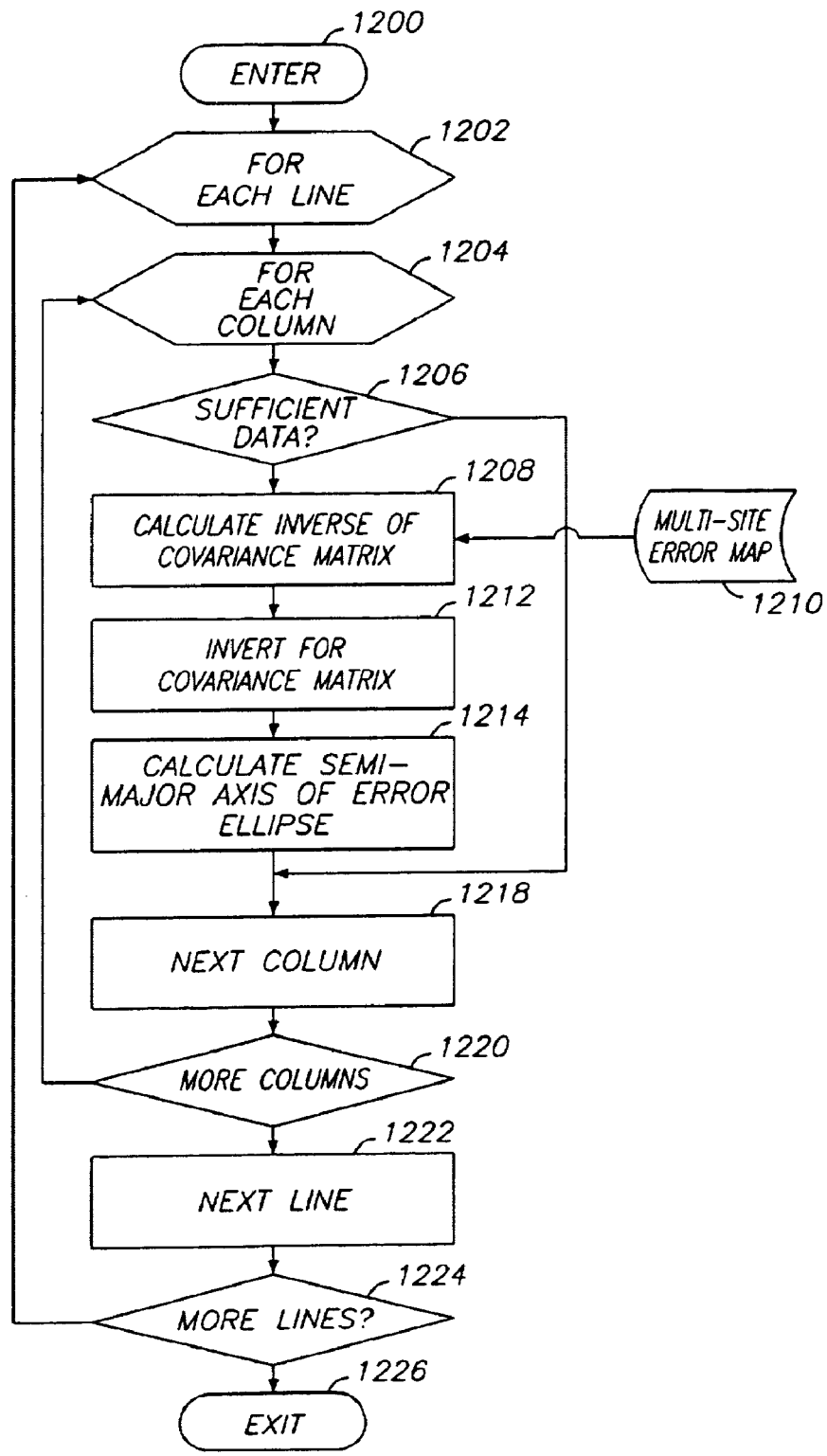
FIG. 12 is a simplified process flow for generating a location error map, according to one embodiment of the present invention.

Referring now to FIG. 12, for each line and each column (blocks 1202 and 1204), using the Multi-site Error map 1210, the inverse of the covariance matrix is calculated in block 1208. The inverted matrix 1212 is then used to calculate the semi-major axis of the error ellipse in block 1214.

The covariance matrix for AOA is:

$$P = \begin{bmatrix} \sum\left(\frac{-\Delta y_k}{d_k * v_k}\right)^2 & \sum\left(\frac{-\Delta y_k}{d_k * v_k}\right)*\left(\frac{\Delta x_k}{d_k * v_k}\right) \\ \sum\left(\frac{-\Delta y_k}{d_k * v_k}\right)*\left(\frac{\Delta x_k}{d_k * v_k}\right) & \sum\left(\frac{\Delta x_k}{d_k * v_k}\right)^2 \end{bmatrix}^{-1} = \begin{bmatrix} \sigma_x^2 & p_{12} \\ p_{21} & \sigma_y^2 \end{bmatrix}$$

where:
$\Delta y_k$=vertical component of distance from position to site k.
$\Delta x_k$=horizontal component of distance from position to site k.
$d_k$=distance to site k.
$v_k$=variance of measurement k.

For TDOA, the covariance matrix is:

$$P = \begin{bmatrix} \sum\left(\frac{\Delta x_k}{d_k * v_k}\right)^2 & \sum\left(\frac{\Delta y_k}{d_k * v_k}\right)*\left(\frac{\Delta x_k}{d_k * v_k}\right) & \sum\left(\frac{\Delta x_k}{d_k * v_k}\right) \\ \sum\left(\frac{\Delta y_k}{d_k * v_k}\right)*\left(\frac{\Delta x_k}{d_k * v_k}\right) & \sum\left(\frac{\Delta y_k}{d_k * v_k}\right)^2 & \sum\left(\frac{\Delta y_k}{d_k * v_k}\right) \\ \sum\left(\frac{\Delta x_k}{d_k * v_k}\right) & \sum\left(\frac{\Delta y_k}{d_k * v_k}\right) & \sum\left(\frac{1}{v_k}\right) \end{bmatrix}^{-1}$$

-continued
$$= \begin{bmatrix} \sigma_x^2 & p_{12} & p_{13} \\ p_{21} & \sigma_y^2 & p_{23} \\ p_{31} & p_{32} & \sigma_b^2 \end{bmatrix}$$

where:
$\Delta y_k$=vertical component of distance from position to site k.
$\Delta x_k$=horizontal component of distance from position to site k.
$d_k$=distance to site k.
$v_k$ variance of measurement k.

For combined AOA-TDOA, the first matrix is added to the upper left rows and columns of the second matrix and then the resulting matrix is inverted to yield the desired covariance matrix.

In all three cases, the semi-major axis of the error ellipse is:

$$\sigma = \sqrt{\frac{1}{2}\left[\sigma_x^2 + \sigma_y^2 + \sqrt{(\sigma_x^2 - \sigma_y^2)^2 + 4P_{12}^2}\right]}$$

Figure 13:
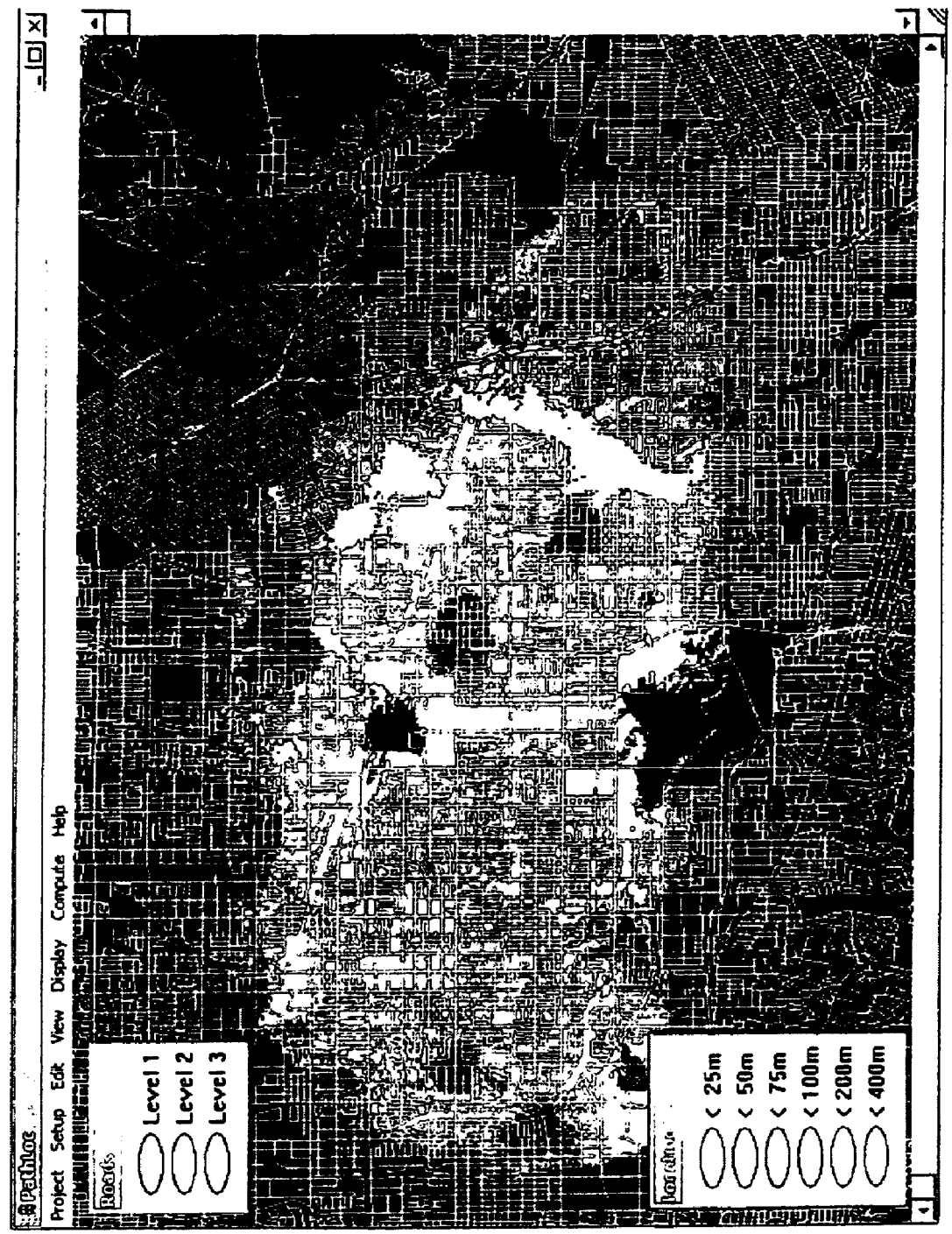
FIG. 13 is an exemplary picture showing location error in a metropolitan area, according to one embodiment of the present invention.
Figure 14:
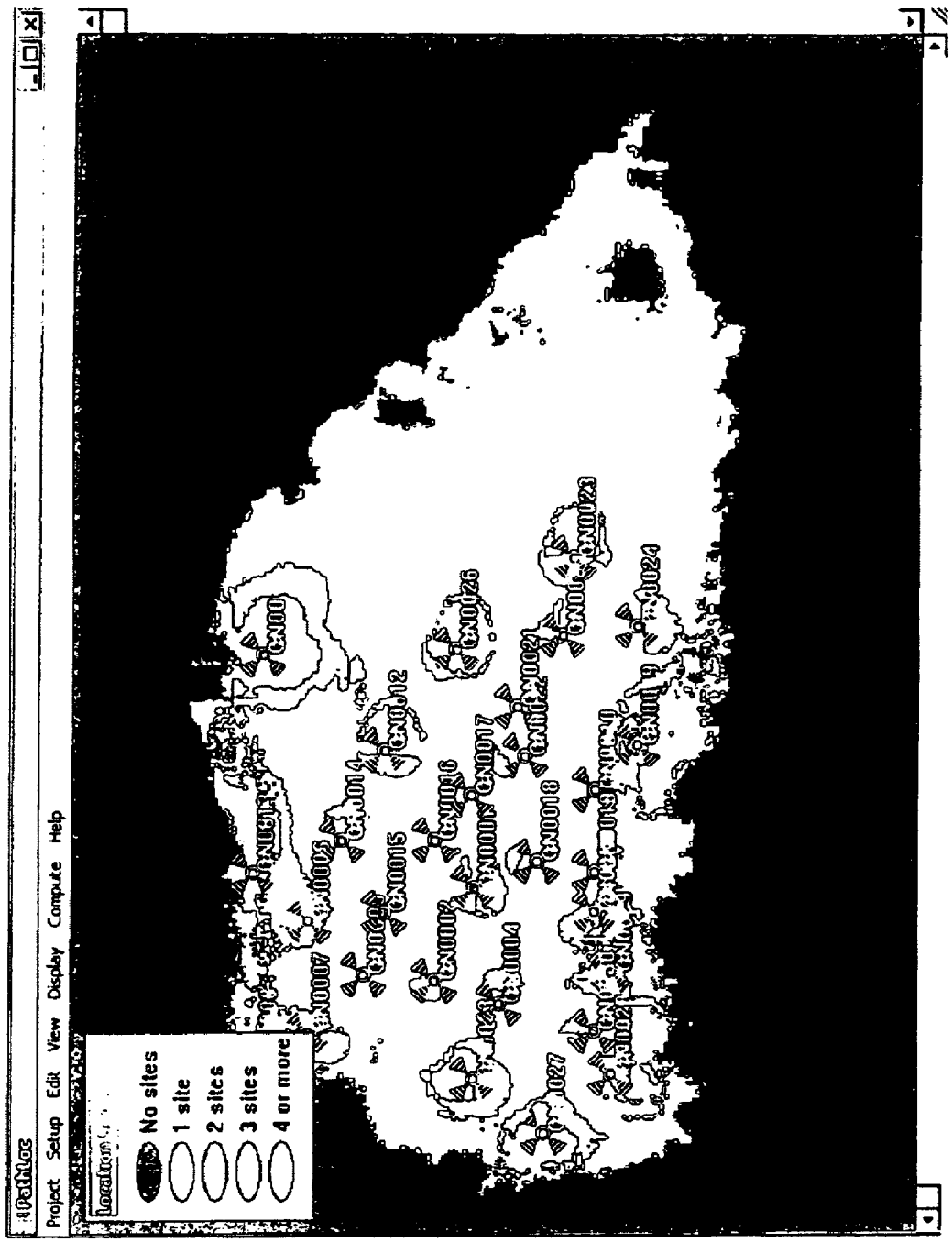
FIG. 14 is an exemplary picture showing number of location sensors receiving useful signal from a handset, according to one embodiment of the present invention.

The error results are then output in the form of a display map covering the cluster or metropolitan area. Color-coding is keyed to the size of the estimated error. An example of this output is shown in FIG. 13. Alternately, the estimated probability that the error will meet a specified criterion is displayed. A host of intermediate results such as forward and reverse link margins and Cellular best server can also be displayed in support of location system planning activities. Another very useful output plot is the number of location sensors "seeing"; i.e., receiving a useful signal above sensitivity floor, from a handset. An example of this type of plot is shown in FIG. 14. Outputs as those shown in FIG. 13 and FIG. 14 provide clear graphical representations of location system accuracy and availability.

Default outputs in many cases are graphical; e.g., location error contours, GDOP contours, coverage areas, color coded regions to indicate the number of observing receivers above a certain threshold., and so on. However, the user has the option to display certain outputs in other formats, e.g., tables.

Printing dialogue windows are user friendly, permitting the user to use both map scale specifications as well as mouse movements to select the printable area. Different icons are used to signify different site categories. For example, existing, proposed, what-if, and neighboring are possible categories that have somewhat different icons to assist the user in the analysis.

The user is able to select the colors for the color-coded displayed categories through dialogue windows under an "Options" menu entry. Preferably, certain color components, e.g., terrain shading gradations, water bodies, morphology categories, highways, etc., may be available for selection by the user. The graphical outputs are of sufficiently high resolution and the refresh speed of the screen is maintained high enough to provide the user with a good work environment.

Moreover, the tool supports common business-quality inkjet color printers. Varying paper sizes are supported by the tool as well. Black and white report and table printing are also supported. In one embodiment, printing control is performed through menu selection. Printer selection and feature control are provided through printer setup dialogue windows. Print item or area selection are provided through dialogue windows. Both keyboard entry of print object size as well as mouse-based specification of an area on the display are possible. Both direct connection to the printer and connection through networks such as a LAN are supported.

The tool also supports interfacing to certain outside systems. It is convenient at times to import database information from outside sources. This, at times, is the only way a database can be maintained current with a dynamic deployment. For example, the cell site database may be maintained in the mobile switching center (MSC) or connected to it and has up to date information on the wireless systems' cells, channel assignments, powers, etc. This information may also be imported by the tool.

The tool also provides data base and system security. Preferably, user created data used in an analysis session cannot be deleted except by its owner or by the system administrator. Also, a user may save the data used in a session for subsequent use. The system includes password access control for using the tool.

With its user friendly GUI, structured menus, and various intermediate and final output options, the tool is a flexible, interactive tool that offers the wireless location system planner a host of powerful design capabilities. Not only does it enable the user to determine location system performance, it also enables him or her to conduct exercises to optimize location site placement, and to perform various coverage and cost-benefit tradeoffs.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for analyzing performance of a wireless location system comprising the steps of:
   storing data related to location equipment, wireless infrastructure, handsets, terrain map, and morphology map;
   generating a site radial file for predicting path loss and predicting time/angle error based on the stored terrain and morphology maps;
   computing a multi-site forward and a multi-site reverse link signal strength map for determining coverage of the location system;
   generating a multi-site margin map and a multi-site delay/angle error map from the computed multi-site forward and reverse link signal strength map and the stored data; and
   generating a location error estimate map for the wireless location system from covariance at each point in the margin map and the multi-site delay/angle error map.

2. The method of claim 1, further comprising the step of displaying the generated error estimate map.

3. The method of claim 1, further comprising the step of storing the generated error estimate data.

4. The method of claim 1, wherein the step of generating a site radial file for path loss and time/angle error comprises the steps of:
   extracting a number of radials per each sector of the site;
   extracting a number of points for each radial;
   computing 4/3 earth altitudes at each point along each radial;
   computing a propagation prediction model to generate a path loss including effects of diffraction and antenna height at each point along each radial;
   computing loss due to antenna pattern; and
   computing time/angle errors at each point along each radial.

5. The method of claim 1, wherein the multi-site map for path loss includes at each point, path loss for the best wireless server and error data for a site with highest received signals.

6. The method of claim 1, further comprising the step of converting the generated radial file to a cluster map for path loss and time/angle error.

7. The method of claim 6, wherein the step of converting comprises the steps of:
   determining a box map dimensions to fit the radial signal file;
   generating a signal map entry for each latitude and longitude in the box map; and
   storing path loss and error in the box map.

8. The method of claim 1, wherein the step of computing a multi-site forward and a reverse link signal strength map comprises the steps of:
   invoking stored terrain and morphology information;
   selecting a stored propagation prediction model from a plurality of stored propagation prediction models;
   computing a forward link propagation loss using the selected propagation prediction model; and
   determining a likely server for a given location.

9. The method of claim 1, further comprising the step of computing a multi-site RX power map.

10. The method of claim 8, wherein the step of computing a multi-site RX power map comprises the steps of:
    using a mobile unit power control window and an estimate of received signal strength on the reverse link for setting a mobile unit's transmit power;
    generating the mobile unit Tx power map; and
    using the generated mobile unit Tx power map for generating a multi-site RX power map.

11. The method of claim 1, wherein the step of computing a multi-site forward and a reverse link signal strength map comprises the step of selecting a propagation prediction algorithm from a plurality of stored propagation prediction algorithms, wherein inputs to the selected propagation prediction algorithm includes one or more of terrain information, location and heights of mobile receiver; location and heights of fixed receiver, land use, major road structures, and peculiar obstacles defined in the area.

12. The method of claim 1, wherein the wireless infrastructure includes one or more of location system type, location system name; unit type; location receivers' antenna category; location system antenna locations; antenna type; number of antenna units at a given installation; location system antenna elevation; location system antenna height; and cabling losses.

13. The method of claim 1, wherein the wireless infrastructure includes one or more of air interface type; cell site locations; site elevation; site height; Number of sectors; antenna gain TX and RX; downtilt; number of channels; control/signaling and voice channel assignments; transmit powers; and mobile unit power control window upper and lower limits.

14. The method of claim 1, further comprising the step of editing the stored morphology map.

15. The method of claim 1, further comprising the steps of reading, maintaining, and displaying one or more of interstate roads, major roads, and secondary roads.

16. The method of claim 1, further comprising the step of performing sensitivity analysis by adjusting a parameter.

17. The method of claim 1, further comprising the steps of generating an output in form of one or more of average errors, RMS errors, number and identity of location receivers, and coverage availability.

18. The method of claim 1, further comprising the step of storing in a database information specific to a location technology including one or more of type of technology; antenna types; receiver sensitivities data; receiver noise data; receiver bandwidth; integration time; known receiver biases; receiver jitter; transfer function; presence of quality indicators at receiver or receiver type; and quality indicators computation.

19. The method of claim 1, further comprising the step of importing data from an outside database.

20. A system for performance analysis of a location system comprising:

means for generating a radial model and a radial map including a plurality of radial paths for a site from a stored raster map;

means for selecting a propagation model from a stored plurality of propagation models for predicting a path loss along each radial path;

at each point along a radial path, means for predicting accumulated angular errors and time delay errors; and means for generating an error estimate from the path loss and the accumulated angular errors and time delay errors due to terrain and morphology.

21. The system of claim 20, further comprising means for displaying the generated error estimate map.

22. The system of claim 20, further comprising means for storing the generated error estimate data.

23. The system of claim 20, further comprising means for generating a location error estimate map.

24. The system of claim 20, wherein the means for generating a radial file comprises:

means for extracting a number of radials per each sector of a site;

means for extracting a number of points for each radial;

means for computing 4/3 earth altitudes at each point along each radial;

means for computing a propagation model to generate a path loss including effects of diffraction and antenna height;

means for computing loss due to antenna pattern; and means for computing time/angle errors.

25. The system of claim 20, further comprising means for converting the generated radial file to a cluster map for path loss and time/angle error.

26. The system of claim 20, further comprising means for computing a multi-site RX power map.

27. The system of claim 26, wherein the means for computing a multi-site RX power map comprises:

means for using a window of received signal strength on the reverse link for setting a mobile unit's transmit power;

means for generating the mobile unit Tx power map; and means for using the generated mobile unit Tx power map for generating a multi-site RX power map.

28. The system of claim 20, further comprising means for performing sensitivity analysis by adjusting a parameter.

29. The system of claim 20, further comprising means for of generating an output in form of one or more of average errors, RMS errors, number and identity of location receivers, and coverage availability.

30. The system of claim 20, further comprising means for importing data from an outside database.

* * * * *